(12) United States Patent
Benson

(10) Patent No.: US 11,968,262 B2
(45) Date of Patent: Apr. 23, 2024

(54) SYSTEM, APPARATUS AND METHOD FOR CONTROLLING NETWORKED DEVICES

(71) Applicant: SIGNAGELIVE LIMITED, Little Chesterford (GB)

(72) Inventor: Marc Benson, Haverhill (GB)

(73) Assignee: SIGNAGELIVE LIMITED, Little Chesterford (GB)

( * ) Notice: Subject to any disclaimer, the term of this patent is extended or adjusted under 35 U.S.C. 154(b) by 0 days.

(21) Appl. No.: 17/620,891

(22) PCT Filed: Jun. 17, 2020

(86) PCT No.: PCT/GB2020/051450
§ 371 (c)(1),
(2) Date: Dec. 20, 2021

(87) PCT Pub. No.: WO2020/260858
PCT Pub. Date: Dec. 30, 2020

(65) Prior Publication Data
US 2022/0321663 A1    Oct. 6, 2022

(30) Foreign Application Priority Data

Jun. 28, 2019 (GB) .................................... 1909331

(51) Int. Cl.
*H04L 67/125* (2022.01)
*H04L 12/28* (2006.01)
(Continued)

(52) U.S. Cl.
CPC ........ *H04L 67/125* (2013.01); *H04L 12/2836* (2013.01); *H04L 67/025* (2013.01);
(Continued)

(58) Field of Classification Search
CPC ....... H04L 12/2807; H04L 12/281–282; H04L 65/60–765; H04L 69/08–085;
(Continued)

(56) References Cited

U.S. PATENT DOCUMENTS 9,304,783 B2 * 4/2016 Maity .................. G06F 9/4416
10,154,122 B1 * 12/2018 Coburn, IV ........ H04L 12/1822
(Continued)

FOREIGN PATENT DOCUMENTS

EP        2739012 A1    6/2014

OTHER PUBLICATIONS

Search Report for co-pending GB1909331.9, 3 pages, dated Oct. 4, 2019.
(Continued)

*Primary Examiner* — Brendan Y Higa
(74) *Attorney, Agent, or Firm* — Kagan Binder, PLLC

(57) ABSTRACT

A system comprises a computer device, such as a host apparatus, a second device, such as a digital signage player, which is connectable to the computer device, and an external device connectable to the second device. The computer device sends a command to the second device. The command causes the second device to send a message to the external device. The command includes destination information for the external device and a command payload, whereby the second device can be controlled to send a message to the external device corresponding to the destination information with a message payload corresponding to the command payload and compatible with the external device.

20 Claims, 25 Drawing Sheets

(51) Int. Cl.
*H04L 67/025* (2022.01)
*H04L 67/561* (2022.01)
*H04N 21/414* (2011.01)
*H04N 21/4363* (2011.01)

(52) U.S. Cl.
CPC ..... *H04L 67/561* (2022.05); *H04N 21/41415* (2013.01); *H04N 21/4363* (2013.01)

(58) Field of Classification Search
CPC ... H04L 69/18–26; H04L 12/283–2836; H04L 12/2803–2821; H04L 67/56–565; H04N 21/20–2146; H04N 21/2343–234339; H04N 21/26241; H04N 21/2668; H04N 21/4122; H04N 21/414–41415; H04N 21/8586; H04N 21/436–43637; G06F 3/14–153; G06F 3/1423–1462; G06Q 30/0241–0284
See application file for complete search history.

(56) References Cited

U.S. PATENT DOCUMENTS

| | | | |
|---|---|---|---|
| 10,402,250 B2* | 9/2019 | Lee | H04N 21/4331 |
| 10,587,453 B2* | 3/2020 | Maity | H04L 41/0226 |
| 10,609,441 B1* | 3/2020 | Mongeau | H04N 21/41415 |
| 2005/0086695 A1* | 4/2005 | Keele | H04H 60/06 725/74 |
| 2007/0192253 A1* | 8/2007 | Gill | H04N 21/41407 705/51 |
| 2007/0282898 A1* | 12/2007 | Stark | H04N 21/26258 |
| 2009/0144157 A1* | 6/2009 | Saracino | G06Q 30/02 726/4 |
| 2009/0276491 A1* | 11/2009 | Lin | H04L 67/145 709/204 |
| 2009/0313659 A1* | 12/2009 | Samuels | G08B 13/19656 725/78 |
| 2010/0306673 A1* | 12/2010 | Ben Natan | G06Q 30/02 715/753 |
| 2012/0210379 A1* | 8/2012 | McCoy | H04N 21/64322 725/109 |
| 2012/0324515 A1* | 12/2012 | Dashevskiy | H04N 21/42224 725/78 |
| 2013/0163580 A1* | 6/2013 | Vass | H04L 65/1069 370/352 |
| 2014/0344430 A1* | 11/2014 | Ayanam | H04L 41/0213 709/223 |
| 2015/0097848 A1* | 4/2015 | Maeda | G06F 9/44 345/531 |
| 2015/0229700 A1* | 8/2015 | Marigondanahalli Rudrappa | H04L 65/612 709/203 |
| 2015/0312610 A1* | 10/2015 | Bruneaux | H04N 21/2665 725/30 |
| 2018/0007421 A1* | 1/2018 | Yoo | H04N 21/26258 |
| 2019/0087182 A1* | 3/2019 | Thomas | H04L 41/34 |
| 2019/0141101 A1* | 5/2019 | Kumetani | H04W 12/06 |
| 2019/0141376 A1* | 5/2019 | Kumetani | H04N 21/25816 |
| 2020/0184513 A1* | 6/2020 | Gentile | G06Q 30/0246 |
| 2021/0377619 A1* | 12/2021 | Poder | H04N 21/6168 |

OTHER PUBLICATIONS

International Search Report for co-pending PCT/GB2020/051450, 2 pages, dated Jul. 10, 2020.

* cited by examiner

Dashboard

Player Dashboard

| Active & Licensed Player | | Players checking in correctly | | Active & Licensed Players | Search | Players with latest content | | Renewals Due (Next 7 Days) | |
|---|---|---|---|---|---|---|---|---|---|
| 1 | | 0 | | | | 1 | | 0 | |
| Deactivated (0) | Expired (0) | Players that are not checking in correctly (1) | | | | Pending Content (0) | No Status (0) | Next 30 Days (0) | Next 60 Days (0) |

5

Active & Licensed Players (1)

| Player | Content | Reboot | Content Check | Health Check | CPU | Memory | Disk | Temp | Renewal Due |
|---|---|---|---|---|---|---|---|---|---|
| 30893 - Marc Development XLT2VA | ☐ | a day ago | a day ago | a day ago | 4% | 52% | 68% | 0°c | in a year |

New Real Time Event from Template

Template: NEC ALP — 24

Enabled On All Supported Players and Assets ☐

Name
Value
Host
Tenant ID

26

OK
Cancel

Figure 6F

New Real Time Event

Name: New Real Time Event — 28

Enabled On All Supported Players and Assets ☐ —32

30A
Preferences

30B — Asset Download
30C — Asset Start
30D — Asset Complete
30E — Asset Remove

None
HTTP
Serial

Cancel    Save

Figure 6G

New Real Time Event

Name: [New Real Time Event]

Enabled On All Supported Players and Assets ☐

Preferences | Asset Download | Asset Start | Asset Complete | Asset Remove

[None] [HTTP] — 34B [Serial]

Type:
URL: GET / PUT / POST — 36A
Headers
Name: [+]

Cancel    Save

Figure 6I

New Real Time Event

| | HTTP | | Serial |
|---|---|---|---|
| None | | | |

- Baud Rate: 115200 — 90A
- Parity: None — 90B
- Flow Control: None — 90C
- EOL: CR-LF — 90D
- Port: 2 — 90E
- Commands: X1234, X23456 — 90F, 90G
- Data Bits: 8
- Stop Bits: 1
- Protocol: ASCII — 90H
- Delay: 100 — 90I

95

Save / Cancel

Figure 7

SYSTEM, APPARATUS AND METHOD FOR CONTROLLING NETWORKED DEVICES

CROSS-REFERENCE TO RELATED APPLICATIONS

This application claims benefit from International Application No. PCT/GB/2020/051450, filed Jun. 17, 2020, which in turn claims priority from Great Britain Application having serial number 1909331.9, filed on Jun. 28, 2019, both of which are incorporated herein by reference in their entireties for all purposes.

TECHNICAL FIELD OF THE DISCLOSURE

The present invention relates to content management systems and methods for generic integration of interfaces between a media player and external systems, as well as to more general networks of differently configured devices.

BACKGROUND OF THE DISCLOSURE

Digital signage has become increasingly popular in recent years and a large segment of the advertising industry, for example, now consists of content displayed digitally. Existing digital signage solutions include a content management system or software (CMS) connected to one or more media players operating on respective display devices. The CMS can send media assets (images, videos etc) to the media player(s), which then control the respective display device to display the media asset. It is known for a media player to send signals, messages or commands to an external device during the media asset lifetime (download to player-play start-play end-remove from player). Sending a signal or message to an external device can control that external device, for example, for externally storing proof of play data, changing lighting effects, adjusting audio or initiation of mechanical systems.

However, as is well-known in the art, any computer, device or other instance (such as a virtual instance) has a specific configuration, which includes the hardware, software and firmware used to implement that instance. Such external devices use different configurations to media players (for example, different software such as APIs or command structures and different transport modes). For example, whilst the media player may be operating on a display device having a serial output port, the media player may not be configured to recognise or send data using a serial connection and so would be unable to communicate with an external device connected to the display device using a serial line. Even if the media player is able to use the same transport mode (e.g. HTTP or serial mode) as the external device, it may not be able to communicate with the API or other software configuration of the external device.

Thus, such digital signage solutions require specific integration of the media player with each external device it is intended to operate with, as well as of the content management system with the updated media player. Existing digital signage solutions therefore do not allow users to configure their own integrations that the signage vendor is not tightly integrated with. If a new external integration is required, then the signage vendor's content management solution, and the media player software which is typically at a remote location, would require an update. This leads to undesirably long project cycles for a new external integration. Furthermore, existing integrations only perform one action at a time and are configured on an asset by asset basis.

It would therefore be desirable if a more straightforward digital signage solution could be provided for non-technical customers to integrate external devices without the need to update the signage vendor's content management solution or media players. This could improve the experience of users of digital signage solutions and signage vendors.

The present invention seeks to solve the above-mentioned problems, and others.

SUMMARY OF THE DISCLOSURE

According to the present invention, there is provided a system comprising a computer device, a second device connected to the computer device, and an external device connected to the second device, wherein the computer device is configured to send a command to the second device, said command causing the second device to send a message to the external device; and the command includes destination information for the external device and a command payload, whereby the second device can be controlled to send a message to the external device corresponding to the destination information with a message payload corresponding to the command payload and compatible with the external device.

Preferably, the command includes a placeholder section; at least one of the destination information and the payload includes a placeholder; the placeholder section defines for the placeholder how data is stored in the second device; and the second device is configured to create the message by substituting the associated data for each placeholder, whereby the message is compatible with the external device.

Preferably, at least one of the destination information and the payload includes at least one of a field for a piece of information and an instruction, the field being compatible with the external device, and a said placeholder associated with the field, and the placeholder section defines for the placeholder how data associated with the field or the instruction is stored in the second device.

The destination information may include a URL and a header, and at least one of the URL and the header may include a said placeholder.

Alternatively, it is preferred that the command payload includes a body section and a placeholder section; the body section includes a field for a piece of information, the field being compatible with the external device, and a placeholder associated with the field; the placeholder section defines for the placeholder how data is stored in the second device; and the second device is configured to create the message payload by substituting the associated data for each placeholder in the body section, whereby the message payload is compatible with the external device.

Preferably, the placeholder section defines for each placeholder the format for the external device.

Preferably, the placeholder section defines for each placeholder at least one of a storage field in the second device, a value, and a data type.

Preferably, each line or item of information, or each command, in the message payload has a corresponding line or item of information, or a corresponding command, in the command payload.

Preferably, the second device is configured to send the command payload as the message payload.

Preferably, the command includes a transport mode compatible with the external device.

Preferably, the external device comprises an API that must be adhered to and has a predetermined data format.

Preferably, the second device is a digital signal player.

Preferably, the command controls the digital signage player to execute the command at a predetermined time in a media asset lifetime.

Preferably, the external device is at least one of a lighting controller, an AV controller, a mechanical device and a data warehouse.

Preferably, the command is associated with at least one of one or more second devices and one or more media assets.

Preferably, the destination information comprises at least one of a URL, connection properties and authentication information.

Preferably, the external device and the second device communicate using a predetermined transport, such as HTTP and serial.

According to another aspect of the invention, there is provided a computer device for use in a system as described above, wherein the computer device comprises: one or more processors; a graphical user interface; and a storage device that stores at least one user editable template for creating said command, wherein the at least one user editable template specifies a configuration for execution on one or more external devices.

Preferably, the user editable template includes a plurality of transport modes, at least one of which is selectable by the user.

Preferably, the user editable template allows a user to: add a plurality of fields to the message, each field for at least one of a piece of information and an instruction, the field being compatible with the configuration of an external device, associate a placeholder with each field, and select for each placeholder an identification of at least one predetermined item of data in the second device which is compatible with the field.

Preferably, the user editable template allows a user to select for each placeholder at least one of a value, a data type and a format of the at least one piece of information and the instruction which is compatible with the configuration of the external device.

The present invention also provides a digital signage player for use in a system as described above, wherein the digital signage player is configured to receive the command from the computer device; and send the message to the external device corresponding to the destination information, the message including the message payload corresponding to the command payload and compatible with the configuration of the external device.

Preferably, the digital signage player is configured to send the command payload as the message payload.

Alternatively, it is preferred that the command includes a placeholder section; at least one of the destination information and payload section includes a placeholder; the placeholder section defines for the placeholder how data is stored in the second device; and the digital signage player is configured to create the message by substituting the data for each placeholder, whereby the message is compatible with the configuration of the external device.

The present invention also provides a method of controlling an external device in a system as described above, the method comprising: sending a command from the computer device to the second device, wherein: the command includes destination information for the external device and a command payload; and the command is configured to cause the second device to send a message to the external device corresponding to the destination information with a message payload corresponding to the command payload and compatible with the external device.

Preferably, the method comprises receiving a command from the computer device at the second device, wherein: the command includes destination information for the external device and a command payload; and the command causes the second device to send a message to the external device corresponding to the destination information with a message payload corresponding to the command payload and compatible with the external device.

The present invention also includes each of the individual components of the system, a method of providing and creating templates, a program and a computer program product.

BRIEF DESCRIPTION OF FIGURES

Preferred embodiments of the invention will now be described by way of example only and with reference to the accompanying drawings, in which:

FIG. 7 is a view of a display of a user interface implementing another aspect of the present invention;

DETAILED DESCRIPTION OF THE PREFERRED EMBODIMENTS

Figure 1:
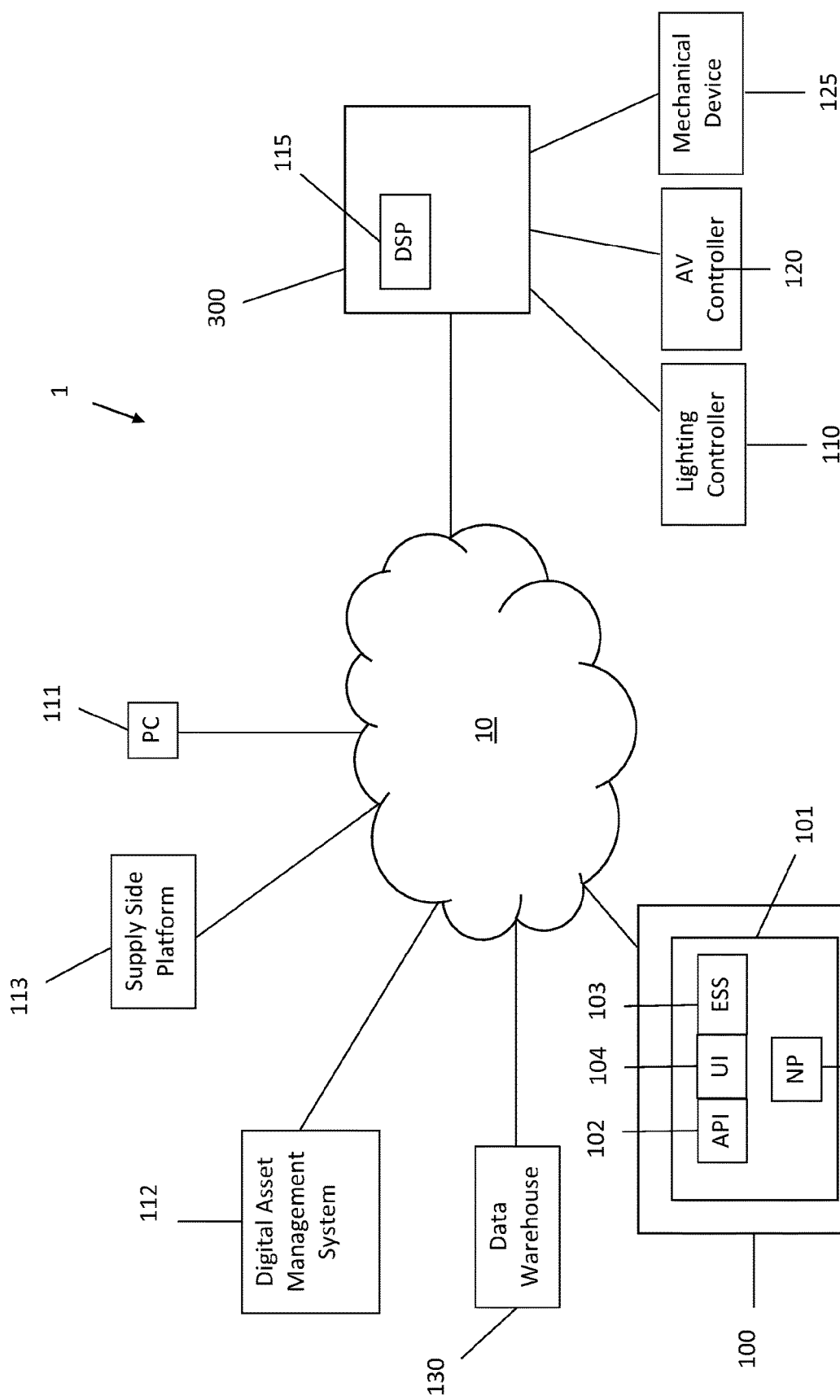
FIG. 1 is a schematic view of a system according to the present invention.
Figure 2:
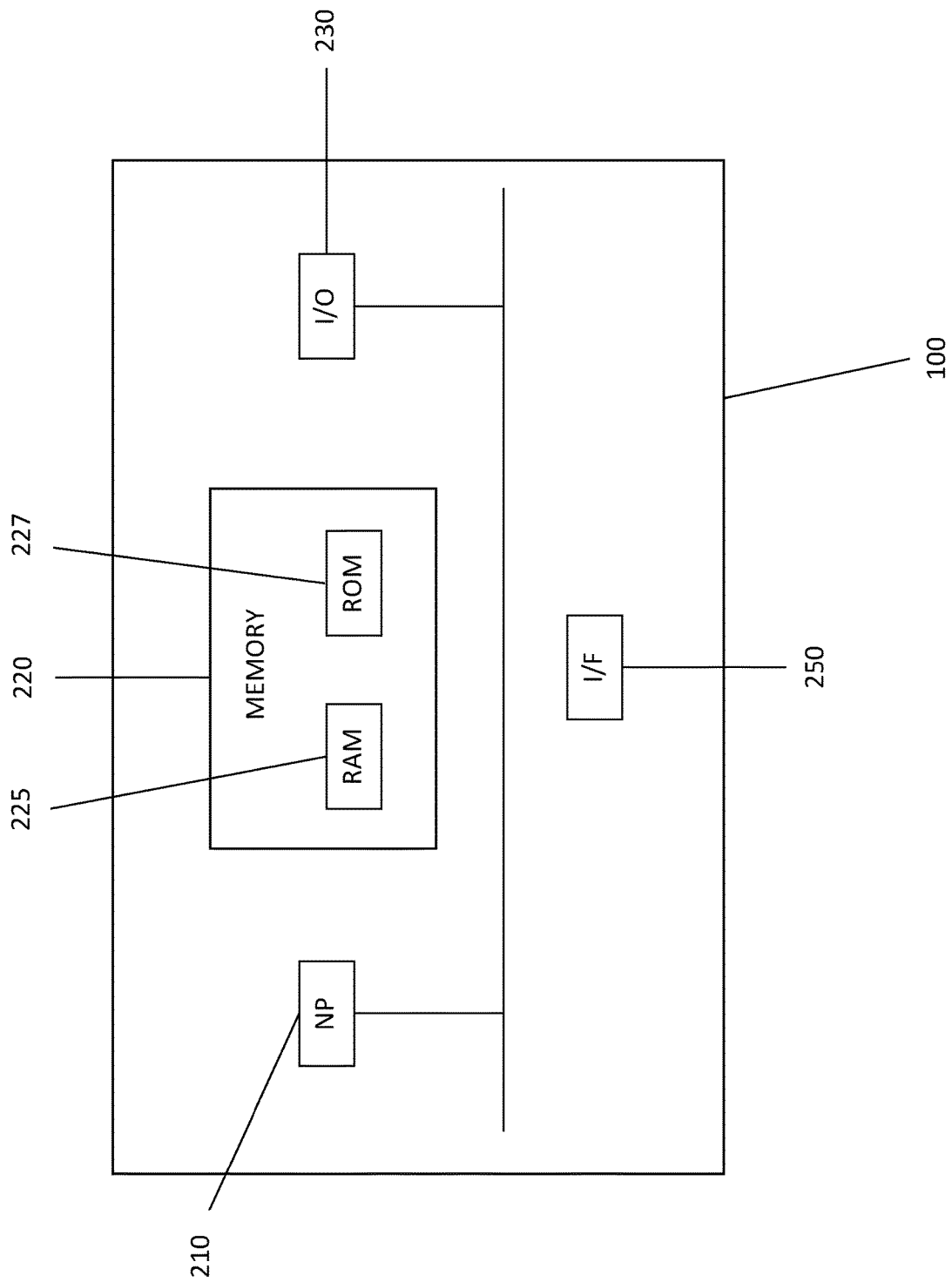
FIG. 2 is a schematic configuration of a computer device.

FIG. 1 illustrates a system and a computing environment 1 according to the present invention. The system comprises a computing device (or system) 100, operating as a content management system (CMS) 101, and a display device 300 with a digital signage player 115 connected to the CMS 101. The computing device 100 may be a server in a single- or multi-server desktop virtualisation system configured to provide virtual machines. Consequently, the CMS 101 may be on the cloud. In the example shown in FIG. 2, the computing device 100 has one or more processors 210 for controlling the overall operation of the server and its associated components. The computing device 100 also has a storage device 220 comprising a ROM 227, which stores programming for the processor 210 to execute, and a RAM 225, which provides a working memory for the processor 210. The computer device 100 also includes an interface 250 to allow it to communicate with other devices.

The storage device 220 stores computer executable instructions, which may be provided to the processor 210 to enable the computing device 100 to perform various functions. For example, the storage device 220 may store software used by the computing device 100 (such as an operating system), application programs, templates for integration configurations, and/or a database. Alternatively, some or all of the computer executable instructions for the computing device 100 may be embodied in hardware. As noted above and shown in FIG. 1, the computing device 100 operates as a content management system (CMS) 101, which may be provided with an application programming interface (API) 102, which can expose the computing system's processes to different third-party software and hardware components. The CMS 101 may also be provided with a user interface UI 104 and an external source synchronisation service 103.

The computing device 100 may also comprise, or be connected to input/output means I/O 230, for example also including one or more of a display, keyboard, mouse, speakers and touchscreen (not shown).

The computing device 100 may operate in a networked environment and communicate with one or more remote or virtual systems by means of the interface 250. Consequently, the computer device 100 may communicate with other devices (or modules on such devices) such as a digital asset management system 112, a supply side platform 113 and the display device 300 as shown in FIG. 1. The network connections may include the Internet, a local area network and a wide area network, but may also include other networks and direct connections. Other means of establishing a communication link between the computing device 100 and the display device 300 may be used, such as a Bluetooth connection.

The digital signage player 115 is a computing device configured for processing data to play digital media content, for example, in a predefined loop (playlist), according to a time based schedule, or dynamically based on external inputs such as data, external triggers or user interactivity.

Figure 3:
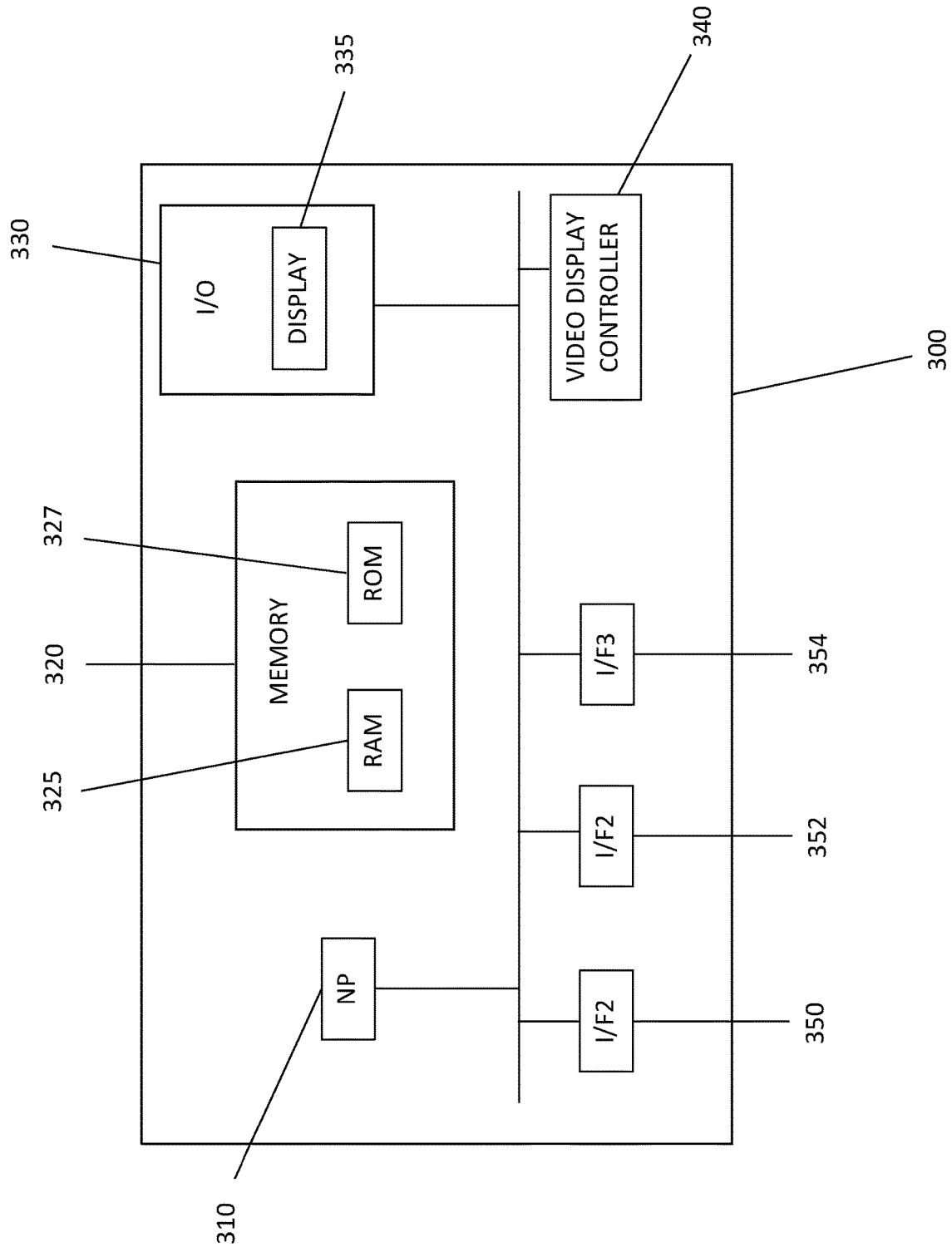
FIG. 3 is a schematic configuration of a display device.

The digital signage or media player 115 comprises one or more processors, a memory or several types of memories, including volatile and non-volatile memory, and a communication interface that allows the digital signage player 115 to communicate with other devices. In the present As shown in FIG. 3, the display device 300 has one or more processors 310 for controlling the overall operation of the display and its associated components. The display device 300 also has a storage device 320 comprising a ROM 327, which stores programming for the processor 310 to execute, and a RAM 325, which provides a working memory for the processor 210. The display device 300 also includes a video display controller 340, and various different interfaces I/F 350, 352 and 254 to allow it to communicate with other devices. For example, I/F 350 allows communication with the Internet over a LAN cable, I/F 352 allows serial connection using a standard serial port, and I/F 354 allows Bluetooth connection. It will be understood that any other suitable type of interface may be provided too.

The storage device 320 stores computer executable instructions, which may be provided to the processor 310 to enable the digital signage player 115 to perform various functions. For example, the storage device 320 may store software used by the display device 300 (such as an operating system), application programs and so forth. Alternatively, some or all of the computer executable instructions for the display device 300 may be embodied in hardware. As noted above and shown in FIG. 1, in the present embodiment the processor 310 and associated hardware and software implement a digital signage player 115. However, the digital signage player 115 may be implemented separately within the display device or separately from the display device, as discussed above.

The display device 300 also has input/output means I/O 330, including a display 335, control buttons, and speakers (not shown). The display 335 may be a screen, such as an OLED screen or LCD screen, or may be a projector, for example. The digital signage player 115 operates on the display device 300 and controls what is displayed on the display 335 and preferably also the speakers, if provided.

The digital signage player 115 is connected via appropriate interface(s) 350, 352, 354 to one or more external devices 110, 120, 130, which may also include the digital asset management system 112 and the supply side platform 113. Other examples of the external device include hardware such as audio visual or AV control 120, for controlling AV equipment such as a projector or a speaker, different to the display device 335 on which the digital signage player 115 operates; a lighting controller 110, and a mechanical device 125 such as a robotic arm or a turntable. The external device may also be a data warehouse 130 or other computing device, which may include an API with which the digital signage player 115 needs to integrate.

The digital signage player 115 also need not be implemented on a display device 300, but can be implemented on a personal computer or other device connected with the display device 300. If implemented separately from the display device, it will be understood that the digital signage player 115 is provided with the required memory, processing capability and interfaces discussed above.

The digital signage player 115 may be connected to and send commands and messages to each external device in any suitable manner, for example using a serial connection, a network connection using HTTP, UDP, TCP, Bluetooth, beacons, USB, NFC tags, other network protocols and so forth, consistent with the requirements of the external device. For example, if the external device is AV equipment 110 connected to the digital signage player 115 with a serial connector, the digital signage player 115 may send the AV equipment messages using the serial connection as the transport mode, the messages being configured to be compatible with and understood by the AV equipment. Similarly, if the external device is a data warehouse server 130, the digital signage player 115 may send it messages using HTTP as a transport mode over a networked connection (e.g. the Internet), the messages being configured to be compatible with an API operating on the data warehouse server 130. Again, in some embodiments the digital signage player 115 may send messages via HTTP to one or both of the digital asset management system 112 and the supply side platform 113, the messages being configured to be compatible with the respective APIs of those devices 112, 113.

Figure 4:
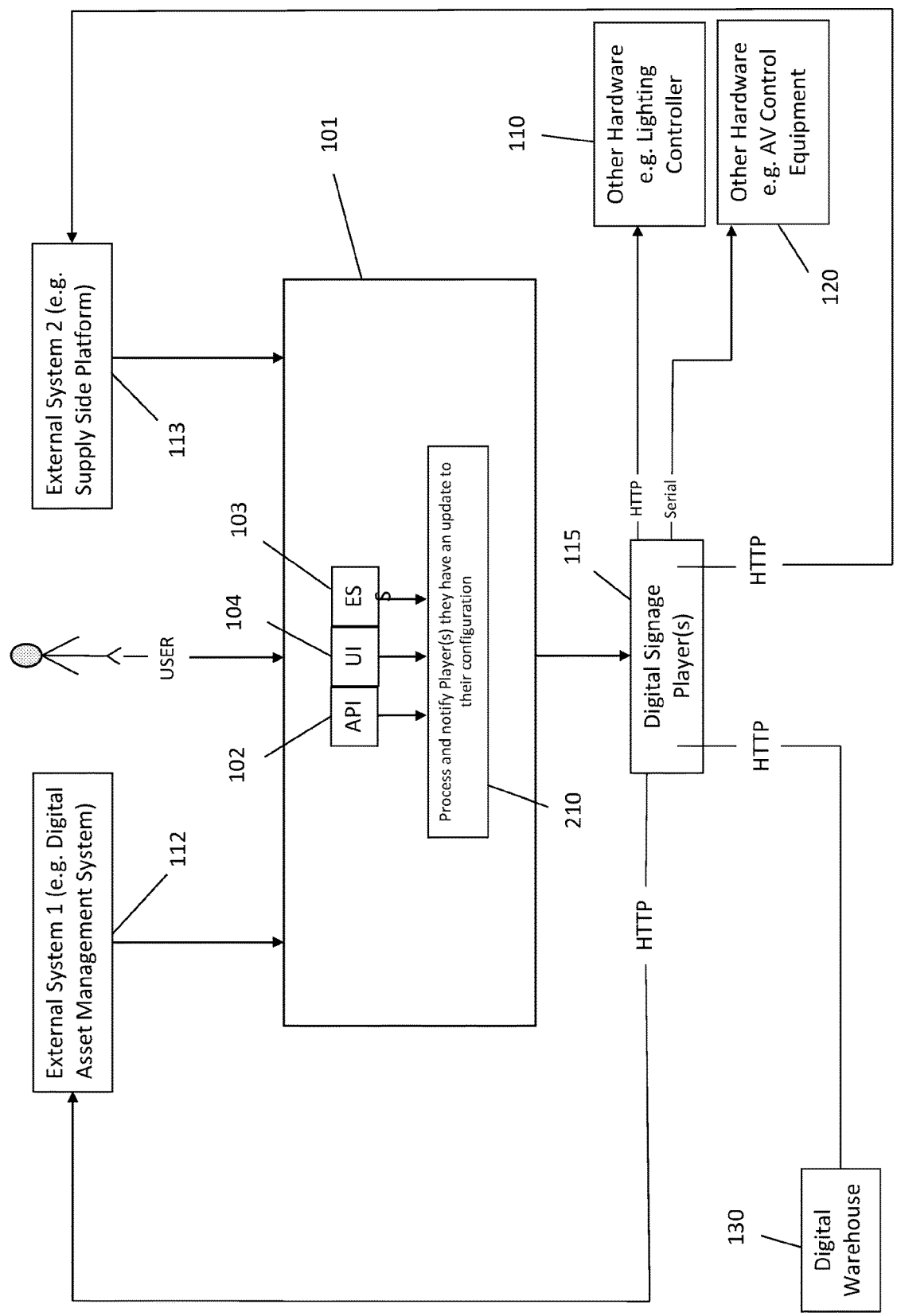
FIG. 4 illustrates an example operating environment of the present invention.
Figure 5A:
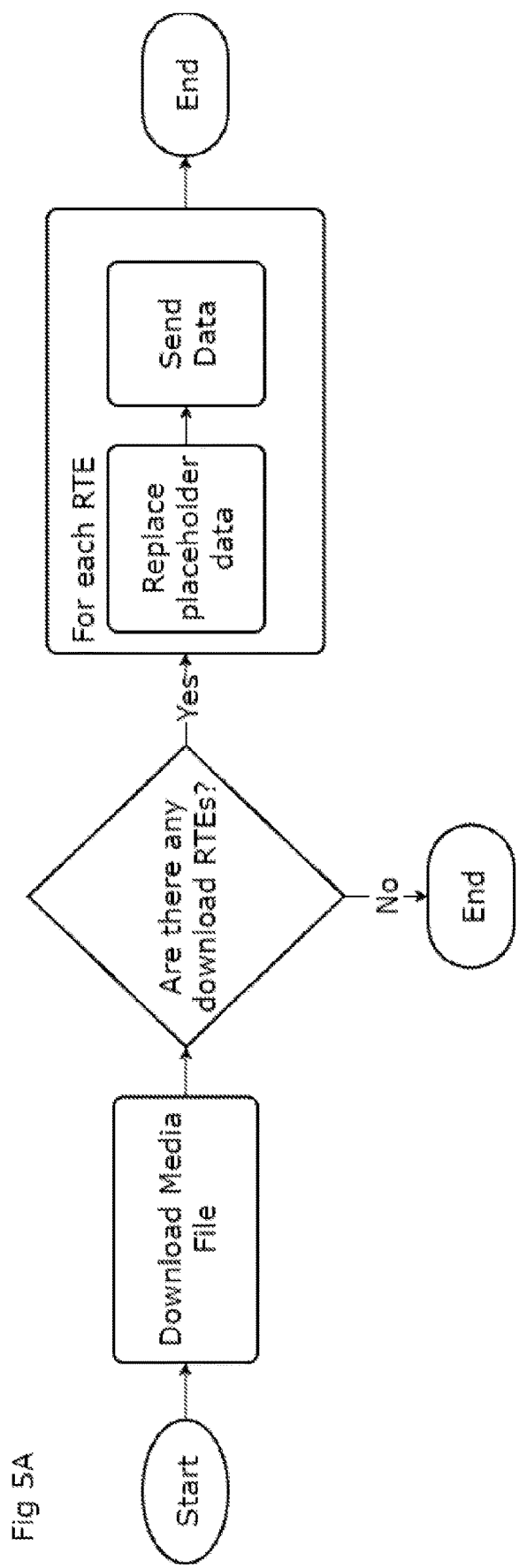
FIGS. 5A to D are flowcharts showing how Real Time Events are processed at each point in a media asset timeline on a digital signage player according to the present invention.
Figure 5B:
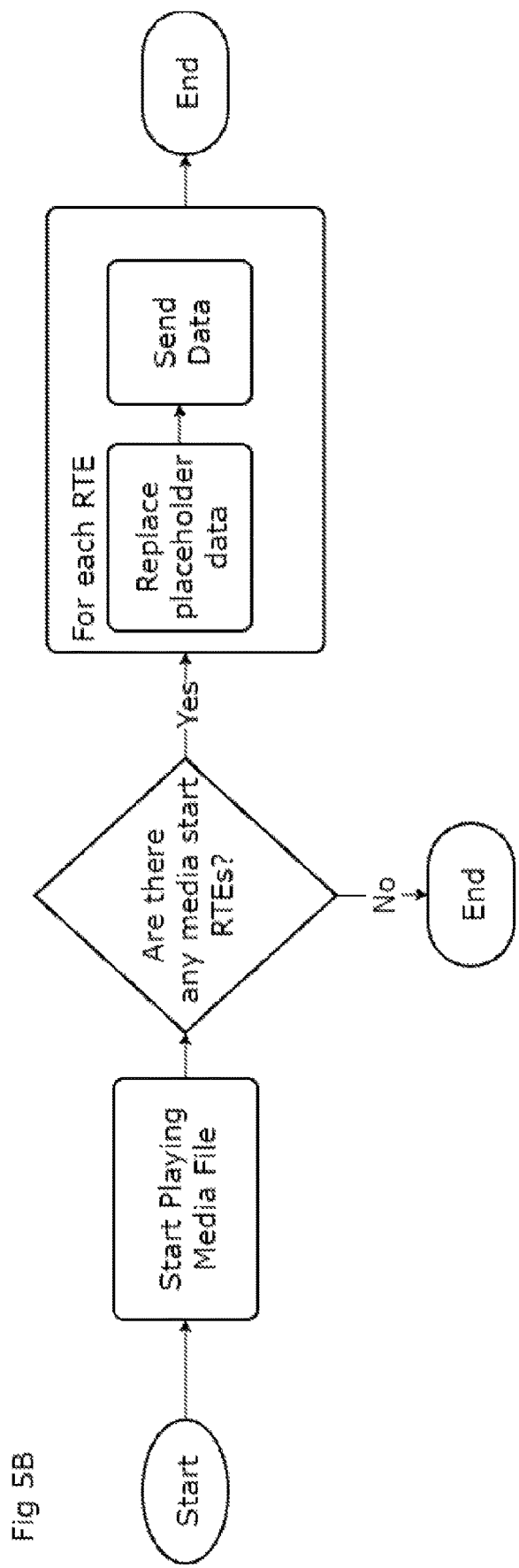
Figure 5C:
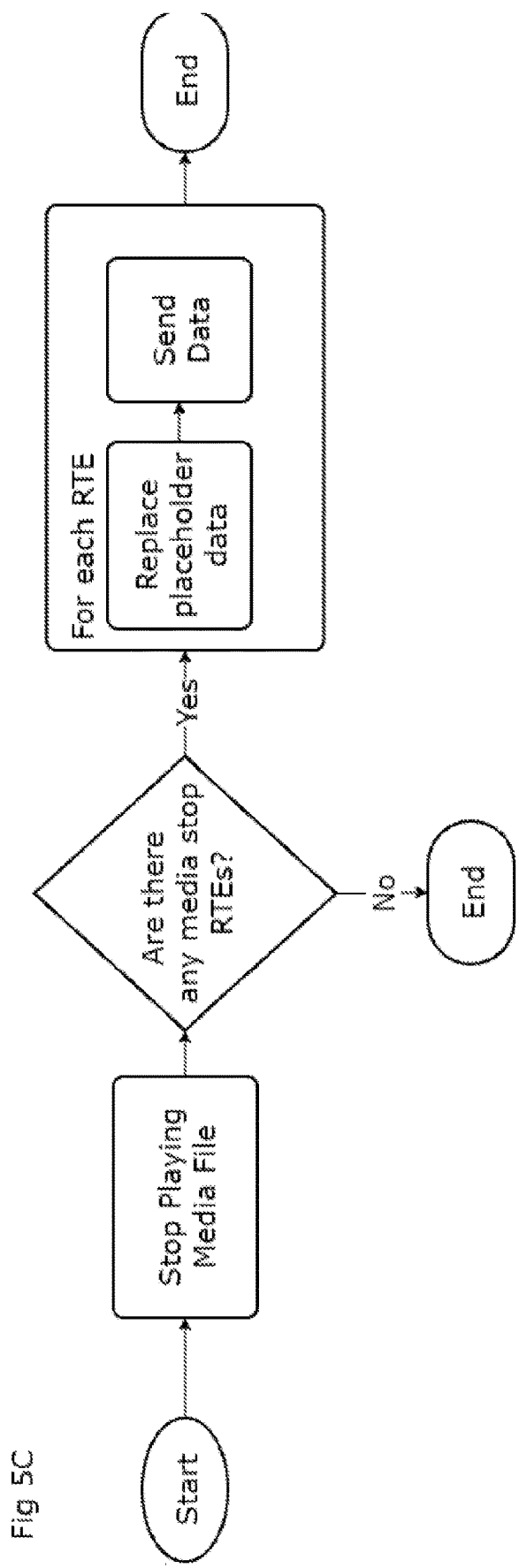
Figure 5D:
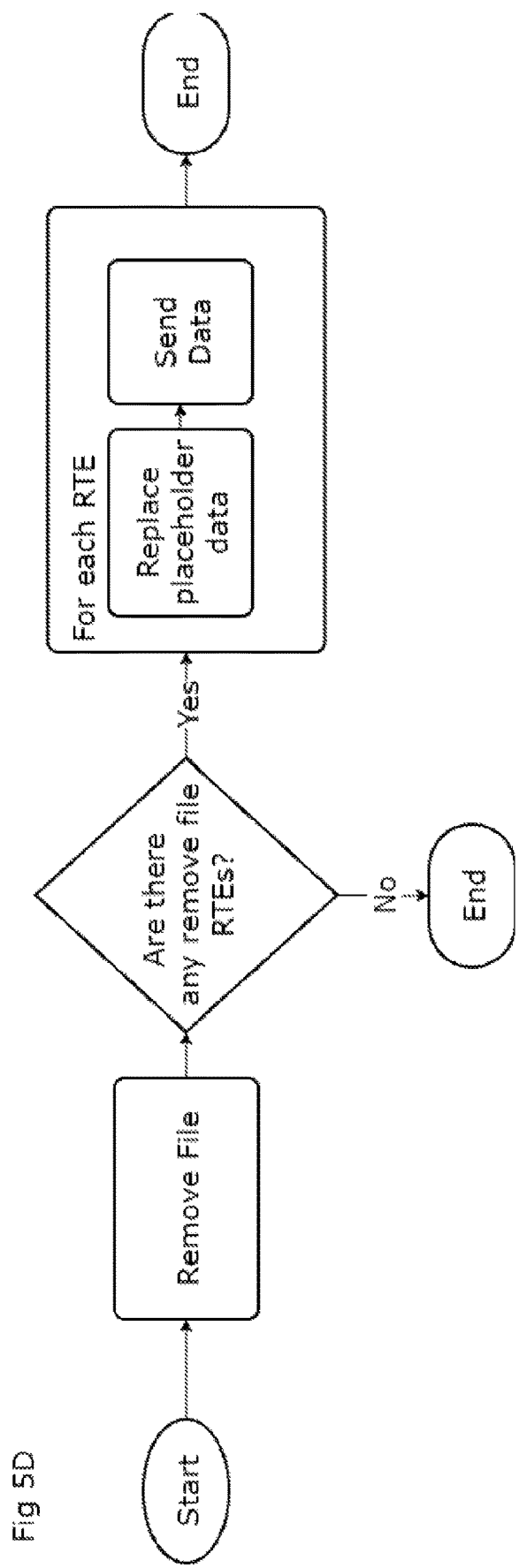

FIG. 4 shows the flow of messages and commands in the computer system 1.

Users of the CMS 101 may be customers representing an organisation. The CMS 101 may include a user interface module 104 configured to drive a display screen, which provides a means by which a user and the computing device 100 can interact.

In some embodiments, the provider of the digital signage solution controls and operates the computer device 100, which is accessed by users remotely, for example over the Internet using a personal computer 111. In this case, the UI 104 of the computer device generates a user interface display etc on the PC 111 over the Internet. Alternatively, the computer device 100 may be operated by the user directly.

The CMS 101 may receive push or pull messages over a network, which are processed by the processor 210 at the computing device 100. For example, the digital asset management system 112 shown in FIG. 1 is an external system that may send a message from a third party to the CMS 101 without the user initiating a request for the message. The supply side platform 113 shown in FIG. 1 is an external system that may send a message from a third party to the computing device 100 on the user's request. For example, the push or pull messages may include media assets, including photos, music, videos, animations, podcasts, text and other multimedia content.

The digital signage player 115 may be configured to connect with a network such as a WAN, LAN or the Internet by a wired or wireless connection to communicate with the computing device 100. The computing device 100 may be connected to a plurality of digital signage players 115 and is configured to control each of them, whether individually, all together or in groups.

A digital signage player 115 that is connected with a network can receive a configuration from the computing device 100, which contains, for example, a content configuration and/or system settings and other properties required to operate, such as logging API endpoints. The content configuration may include any of schedules that need to be played, templates (layouts) and media assets or information about media assets, such as links to the media assets, within the schedule. The content configuration is downloaded and cached in the internal storage of the digital signage player 115. If the content configuration includes information on a media asset, rather than the media asset itself, the media asset may be loaded as it plays over the network, either directly from the computing device 100 or a third-party device serving the content, such as a web page.

Thus, the computing device 100 may send any or all digital signage players 115 signage instructions including a playlist for one or more such media assets, instructing the digital signage player 115 the order and timing in which to download and play the media assets. The computing device 100 may also send other signage instructions, such as screen brightness and volume, which may be different for different media assets.

Each media asset has a defined media asset lifetime on the digital signage player 115, defined by the signage instructions sent to the digital signage player 115, which include
1. download the media asset from the computing device 100
2. start playing the media asset
3. end playing the media asset, and
4. remove the media asset from the digital signage player 115.

One or more media assets may be played in a loop, in which case the start and end events may occur multiple times for a media asset between the download and remove events. Alternatively, a media asset may be downloaded and then removed each time it is played. Media assets that are not downloadable such as streams and web pages will only support start and end events and not download and remove events.

Each media asset may have data associated with it that determines when the asset is valid to play within a schedule, for example, only on specific days or between specific times. Each media asset may also have data associated with it that determines a duration, Proof of Play logging configuration and Real Time Event configurations to execute as the media asset transitions through the signage instruction states 1-4 above received at the digital signage player 115.

The digital signage player 115 may download and store the configuration and media assets in its non-volatile memory to ensure that network bandwidth is efficiently used, and to provide resilience when network connectivity is unavailable.

Subsequently to sending the signage instructions, it is possible for the computer device 100 or other systems to send messages or additional instructions, termed hard or soft triggers, to the digital signage player 115. These hard or soft triggers are typically sent during the playback of a playlist included in the initial signage instructions. Hard triggers can be used to interrupt the current playlist to either stop display entirely or to display different content. As an example, a hard trigger could be used in case of an emergency to inform people of the emergency and action to take. Conversely, soft triggers do not interrupt the media asset currently being played but can instead be used to insert a new media asset at a suitable position in the playlist, for example immediately after finishing playing the current media asset.

Both the initial signage instructions and the subsequent hard and soft triggers can include real time event commands for action by the digital signage player 115. Real time event commands may instruct the digital signage player 115 to send a message, command or instruction to an external device 110, 120, 125, 130, 112, 113 at a specific time in the lifetime of a media asset, as shown in FIG. 4.

FIG. 4 shows the configuration of real time event commands in the CMS 101, transmission of real time event commands to a digital signage player 115 and transmission of messages from the digital signage player 115 to external systems 110, 120, 125, 130, 112, 113. The digital signage player 115 can be updated "live" such as in real time in close correspondence to when a message is received from the computing device 100 (CMS 101).

FIG. 5 shows how real time event commands (which may be termed RTE commands or just RTEs) are processed by the digital signage player 115 at each point in the media asset timeline. As the digital signage player 115 executes the signage instructions, it may process a command to download a media asset from the computer device 100 for subsequent playback. When the media asset is being downloaded, the digital signage player 115 checks whether it has received any RTEs that are associated with download for that media asset. If it has, it processes that RTE as will be discussed in more detail below. Similarly, as it processes the playlist, when the digital signage player 115 executes an instruction to start playing a media asset, it checks whether it has received a corresponding media start RTE and processes it. Again, when the digital signage player 115 executes an instruction to end playing a media asset, it checks whether it has received a corresponding media stop RTE and processes it. Again, when the digital signage player 115 executes an instruction to remove a media asset, it checks whether it has received a corresponding remove file RTE and processes it.

Thus, an RTE command induces the digital signage player to execute an action at a specific time in the lifetime of the media asset. The specific time is preferably when the media asset transitions to a new state (such as download, start playing, stop playing or remove). The induced action is to send a message to an external device. The message may be a command or instruction for the external device, or it may simply convey information to the external device. As discussed above, the message that the RTE causes the digital signage player 115 to send to the external device must be compatible with configuration of that external device, including the required transport mode. In the present embodiment, the RTE is configured at the computer device 100 by means of a template so that digital signage player 115 is agnostic to the configuration requirements of the external device.

Below is shown an example of part of an RTE command that can be sent from the computer device 100 to the digital signage player 115. In the example, the digital signage player 115 is connected to the data warehouse 130 over an Internet connection using HTTP as the transport mode.

Thus, the RTE command specifies the URL (https://example.com/customendpoint) of the external device 130 and that the message is a request of the type POST. In addition, it includes a header with the name 'content-type' and the value 'application/json', which is well-known in the art as indicating that the request body format is JSON (JavaScript Object Notation).

The RTE command then includes a body section (here called 'Body') and a list of placeholder definitions (here called 'Placeholders'). The body is the list of instructions or information to be included in the message that the digital signage player 115 sends to the external device 130. In this example, the RTE command is intended to be executed when a media file begins playback, although the example does not show this information. In other words, it is a media start RTE. The purpose of the RTE is to store proof-of-play information in the data warehouse, to demonstrate that a particular media asset has been played. The information in this type of RTE may include an identification of the media asset (for example ID and/or name); an identification of the media player that played the media asset (for example, serial number, description, address and reference; and the start time of each instance the media asset was played.

| URL | https://example.com/customendpoint |
|---|---|
| Type | POST |

Headers

| content-type | application/json |
|---|---|

Body

```
{
"serialNumber":"$player_serial_number$",
"description":"$player_description$",
"address1":"$player_address_1$":"$,"
"address2":"$player_address_2$",
"city":"$player_city$",
"state":"$player_state$",
"zip":"$player_zip$",
"ref1":"$player_ref_1$",
"ref2":"$player_ref_2$",
"ref3":"$player_ref_3$",
"start_time_epoch_seconds":"$pma_ start_time_ epoch seconds$",
"start_time_iso8601":"$pma_start_time_iso8601$",
"start_time_custom_d":"$pma_start_time_custom_d$",
"start_time_custom_dd":"$pma_start_time_custom_dd$",
"start_time_custom_h":"$pma_start_time_custom_h$",
"start_time_custom_hh":"$pma_start_time_custom_hh$",
"start_time_custom_H":"$pma_start_time_custom_H$",
"start_time_custom_HH":"$pma_start_time_custom_HH$",
"start_time_custom_m":"$pma_start_time_custom_m$",
"start_time_custom_mm":"$pma_start_time_custom_mm$",
"start_time_custom_M":"$pma_start_time_custom_M$",
"start_time_custom_MM":"$pma_start_time_custom_MM$",
"start_time_custom_s":"$pma_start_time_custom_s$",
"start_time_custom_ss":"$pma_start_time_custom_ss$",
"start_time_custom_t":"$pma_start_time_custom_t$",
"start_time_custom_tt":"$pma_start_time_custom_tt$",
"start_time_custom_yyyy":"$pma_start_time_custom_yyyy$",
"start_time_custom_yyyyMMddTHHmmss":"$pma_start_time_custom_yyyyMMddTHHmmss$"
"pma id":"$pma_id$",
"pma_id":" int":"$pma_ id int$",
"pma_media_asset_id":"$pma_ media_asset_id$",
"pma_media_asset_id_int":"$pma_media_asset_id_int$",
"pma_media_asset_name":"$pma_ media_asset_name$"
}
```

Placeholders

Name: $player_serial_number$, Field: clientDetails.signageliveSerialNumber, Data Type: String
Name: $player_description$, Field: clientDetails.description, Data Type: String
Name: $player_address_1$, Field: clientDetails.address1, Data Type: String
Name: $player_address_2$, Field: clientDetails.address2, Data Type: String
Name: $player_city$, Field: clientDetails.city, Data Type: String
Name: $player_state$, Field: clientDetails.state, Data Type: String
Name: $player_zip$, Field: clientDetails.zipCode, Data Type: String
Name: $player_ref_1$, Field: clientDetails.referenceCode1, Data Type: String
Name: $player_ref_2$, Field: clientDetails.referenceCode2, Data Type: String
Name: $player_ref_3$, Field: clientDetails.referenceCode3, Data Type: String
Name: $pma_start_time_epoch_seconds$, Field: start, Data Type: DateTime, Format: epochSeconds
Name: $pma_start_time_iso8601$, Field: start, Data Type: DateTime, Format: ISO8601
Name: $pma_start_time_custom_d$, Field: start, Data Type: DateTime, Format: Custom[d]
Name: $pma_start_time_custom_dd$, Field: start, Data Type: DateTime, Format: Custom[dd]
Name: $pma_start_time_custom_h$, Field: start, Data Type: DateTime, Format: Custom[h]
Name: $pma_start_time_custom_hh$, Field: start, Data Type: DateTime, Format: Custom[hh]
Name: $pma_start_time_custom_H$, Field: start, Data Type: DateTime, Format: Custom[H]
Name: $pma_start_time_custom_HH$, Field: start, Data Type: DateTime, Format: Custom[HH]
Name: $pma_start_time_custom_m$, Field: start, Data Type: DateTime, Format: Custom[m]
Name: $pma_start_time_custom_mm$, Field: start, Data Type: DateTime, Format: Custom[mm]

-continued

Name: $pma_start_time_custom_M$, Field: start, Data Type: DateTime, Format: Custom[M]
Name: $pma_start_time_custom_MM$, Field: start, Data Type: DateTime, Format: Custom[MM]
Name: $pma_start_time_custom_s$, Field: start, Data Type: DateTime, Format: Custom[s]
Name: $pma_start_time_custom_SS$, Field: start, Data Type: DateTime, Format: Custom[SS]
Name: $pma_start_time_custom_t$, Field: start, Data Type: DateTime, Format: Custom[t]
Name: $pma_start_time_custom_tt$, Field: start, Data Type: DateTime, Format: Custom[tt]
Name: $pma_start_time_custom_ yyyy$, Field: start, Data Type: DateTime, Format: Custom[yyyy]
Name: $pma_start_time_custom_yyyyMMddTHHmmss$, Field: start, Data Type: DateTime, Format: Custom[yyyy-MM-ddTHH:mm:ss]
Name: $pma_id$, Field: pma.externalId, Data Type: Id, Format: String Name: $pma_id_int$, Field: pma.externalId, Data Type: Id, Format: Int
Name: $pma_media_asset id$, Field: pma.mediaAsset.externalId, Data Type: Id, Format: String
Name: $pma_media_asset id int$, Field: pma.mediaAsset.externalId, Data Type: Id, Format: Int
Name: $media_asset_name$, Field: mediaAsset.name, Data Type: String In this example, the Body includes a number of lines of information each of the format "x":"$y$". Here, "x" before the colon (:) is a field for the information being sent to the data warehouse 130 and is in a format understood by the API of the data warehouse 130. This field is static or fixed and there is no need for the digital signage player 115 to change or adjust it in any way. The information after the colon is the field value that is stored by the data warehouse 130 in the corresponding field. For example, the label "serialNumber" indicates that the associated value is the serial number of the digital signage player 115 sending the RTE-engendered message to the digital signage player 115.

Everything in the Body portion of the RTE message that is enclosed by a pair of $ signs is a placeholder, which refers to a separate object that is defined in the Placeholders section. A placeholder can be used for any piece of dynamic information that is stored or created by the digital signage player 115. The Placeholders section defines for the digital signage player 115 what information needs to be associated with the field in the corresponding line of the Body, where it is stored and how it should be formatted. As shown in FIG. 5, when the digital signage player 115 executes an RTE command, it replaces each placeholder in the Body section with the information defined for the corresponding placeholder in the Placeholders section. The digital signage player 115 then sends the message with the derived data to the data warehouse 130.

In the example above, the label "serialNumber" in the Body section is associated with the placeholder "$player_serial_number$". The Placeholders section instructs the digital signage player 115 to replace the placeholder with the information defined as Field: clientDetails.signageliveSerialNumber, Data Type: String—that is, information found in the clientDetails.signageliveSerialNumber memory field in the RAM 325 controlled by digital signage player 115—and that the data type is a string.

Similarly, the placeholder $pma_start_time_iso8601$ is to be replaced with the information stored by the digital signage player 115 in the "start" field relating to the current media asset playing stored in its memory in RAM 235, that the type of date is DateTime data and the format is ISO8601. These are well established data type and format, and are in the format that the API of the data warehouse 130 expects to receive the information. For the purposes of illustration, the part of the exemplary RTE command shown above includes various different fields, with different time and date formats, that could be used to store the start time at which the digital signage player 115 started to play a media asset. It is unlikely in practice that most of them would be used. Naturally, other fields such as the time at which the digital signage player 115 downloaded, ended playing or removed a media asset could also be stored.

Consequently, the RTE command can be conceived as having routing or destination information, such as the URL, and a payload. The payload of the RTE command includes the Body section and the Placeholders section. The digital signage player 115 substitutes the information identified by the placeholders into the Body section and removes the Placeholders section to create the payload of the message that is sent to the external device. In this specification, the payload of an HTTP message should be considered to correspond to the message body of the HTTP message.

It should be noted that it is also conceivable to include placeholders in the destination/routing information, such as the URL. This allows the route to be changed dynamically based on data stored by the digital signage player 115, as well as headers sent along with the payload.

The RTE command can also be conceived as having destination information (for example, the URL), a payload (for example, the body section), and a placeholders section. That is, the placeholders section can be considered to be separate from the payload, and can be accessed by the digital signage player 115 to modify either the destination information or the payload that is sent to the external device.

In any case, as the message to the external device, the digital signage player 115 sends the destination information and the body section after having swapped out any placeholders and put in their place the associated information stored in the digital signage player 115.

By providing RTE commands in this way—in particular, by including different body and placeholder sections, it is possible to command the digital signage player 115 to send a message to an external device 110, 120, 130, 112, 113 without specifically integrating the digital signage player 115 with the external device—that is, without programming the digital signage player 115 to be able to communicate with the external device. Rather, the digital signage player 115 needs only to be able to replace placeholders in the body portion of the RTE command with the information defined in the Placeholders section and send the data to the external device as is. There is no need to integrate the digital signage player 115 with the data warehouse 130 so that it is compatible with the API of the data warehouse 130 and so on.

As noted above, the above example shows only a part of the RTE command. The RTE may also include a specific instruction associating the RTE command with a specific time point in a media asset lifetime and/or a specific media asset.

As shown above, the RTE includes the static data such as destination or routing parameters in the correct format necessary for the digital signage player 115 to be able to send the message to the correct external device, and defines for the digital signage player 115 what dynamic information to substitute into the message prior to sending it. Consequently, there is no need to update the digital signage player 115 with the specifics of how to integrate with the external device. It is only necessary to transmit the destination details and the placeholders for the digital signage player 115 to act on.

Advantageously, this generic configuration allows the creation of templated integrations, which can be accessed by a user via the user interface 104 of the computer device 100. In particular, the controller of the computer device 100 can create a template to allow the digital signage player 115 to work with any additional external device without needing to reprogram the digital signage player 115.

Continuing with the example of a data warehouse 130 using a specific API, the controller of the computer device 100 (or the user) can work with the controller of the data warehouse, if this is a different party, to discover the types and necessary format of information and commands for the data warehouse 130 API to receive information directly from the digital signage player 115. This information can be used to create a template that is stored on the computer device 100 or remotely and that can be accessed using the UI 104. The template may include a number of different options for information and commands to be included in a message engendered by executing an RTE command. The user can work through the different options in the template to create an RTE command.

Figure 6B:
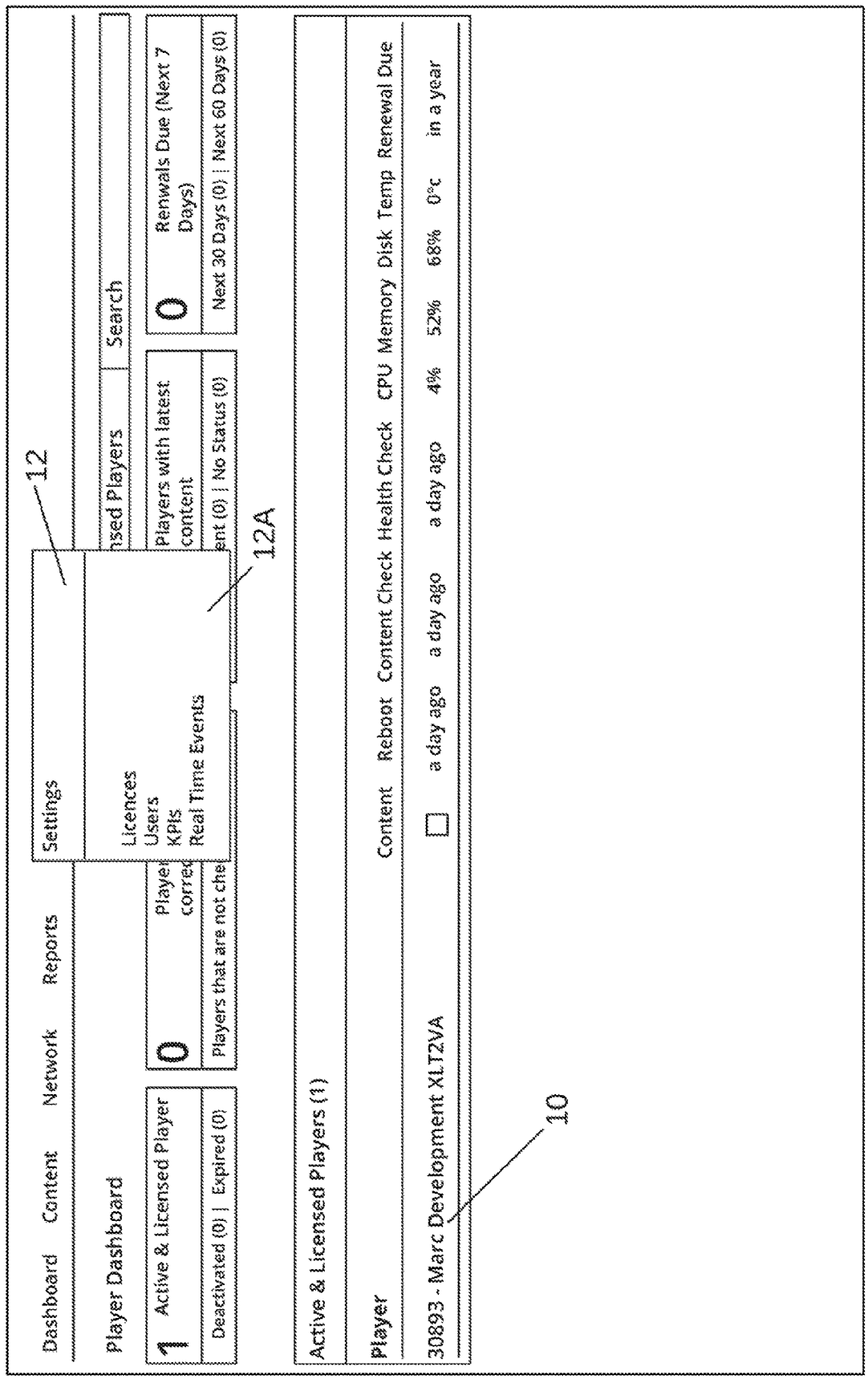
FIGS. 6A to N are views of a display of a user interface implementing an aspect of the present invention.
Figure 6C:
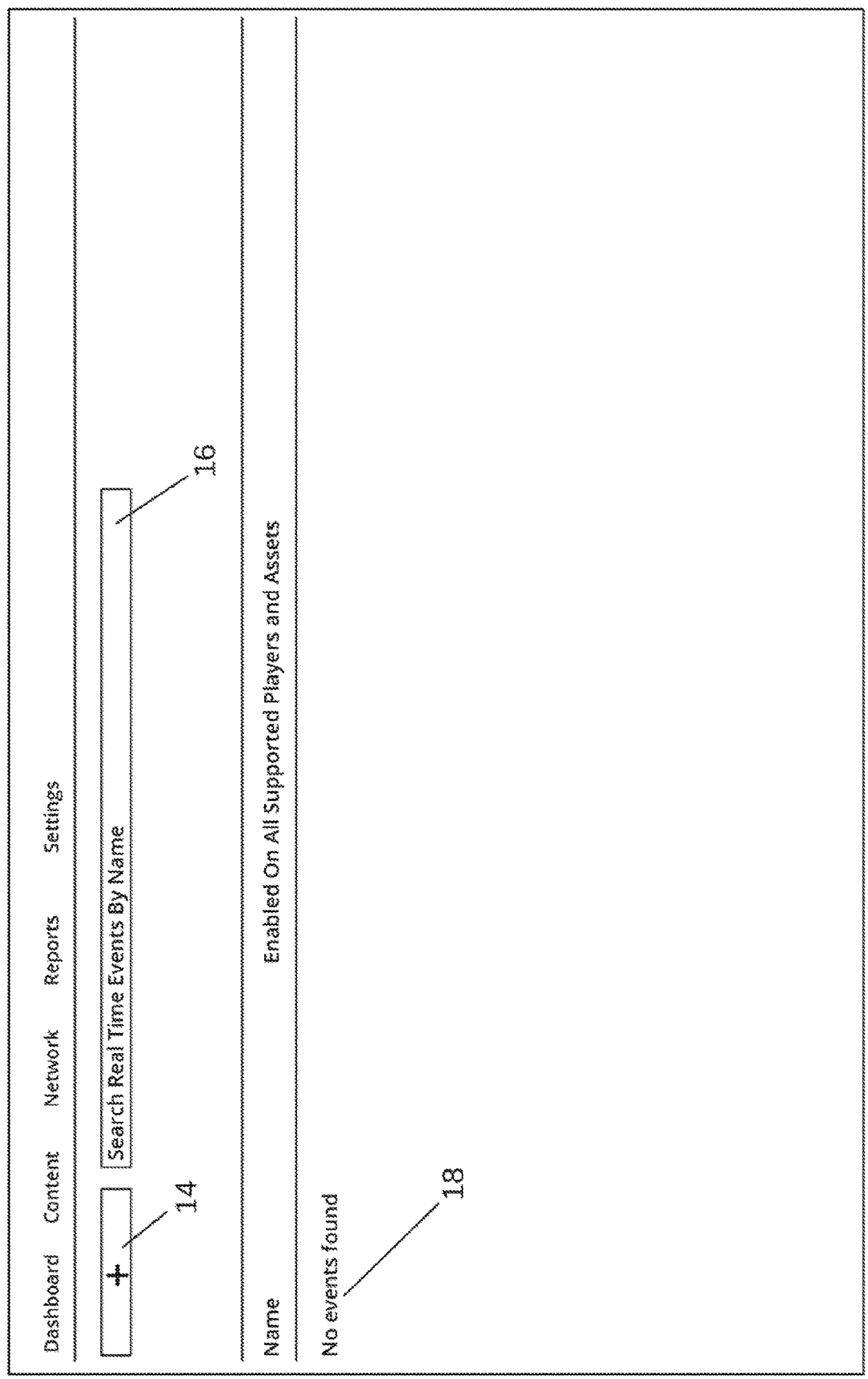
Figure 6D:
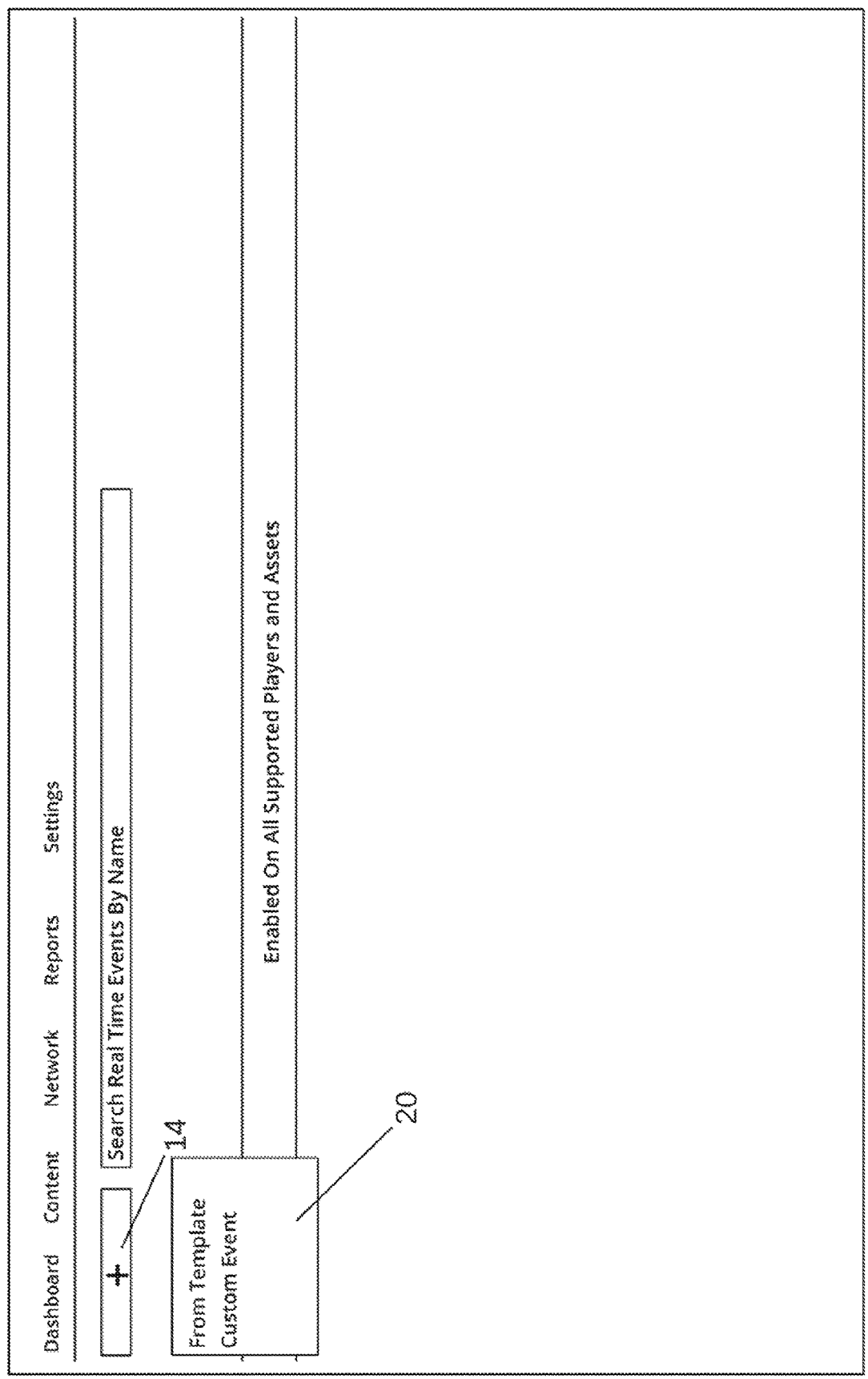
Figure 6E:
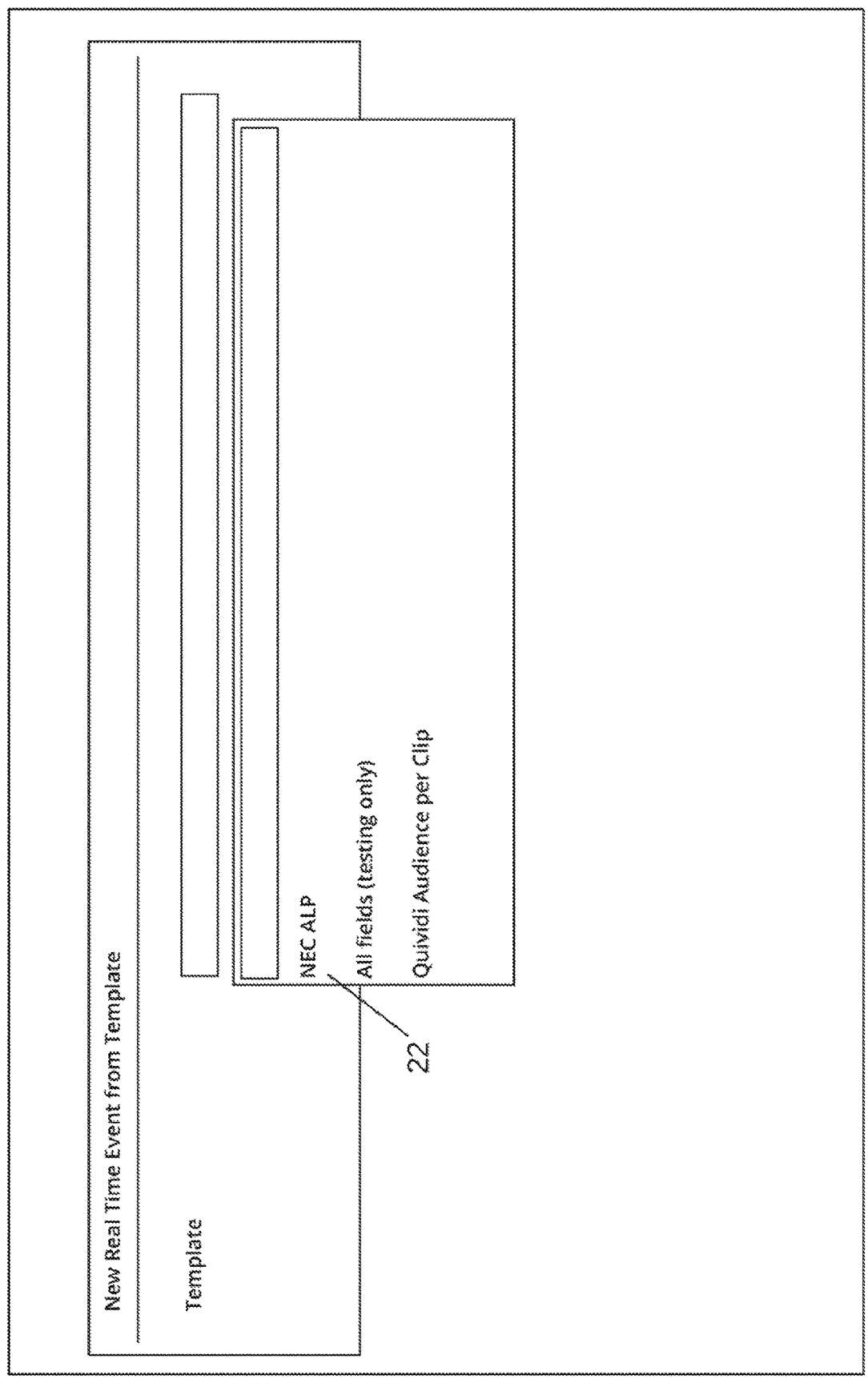
Figure 6H:
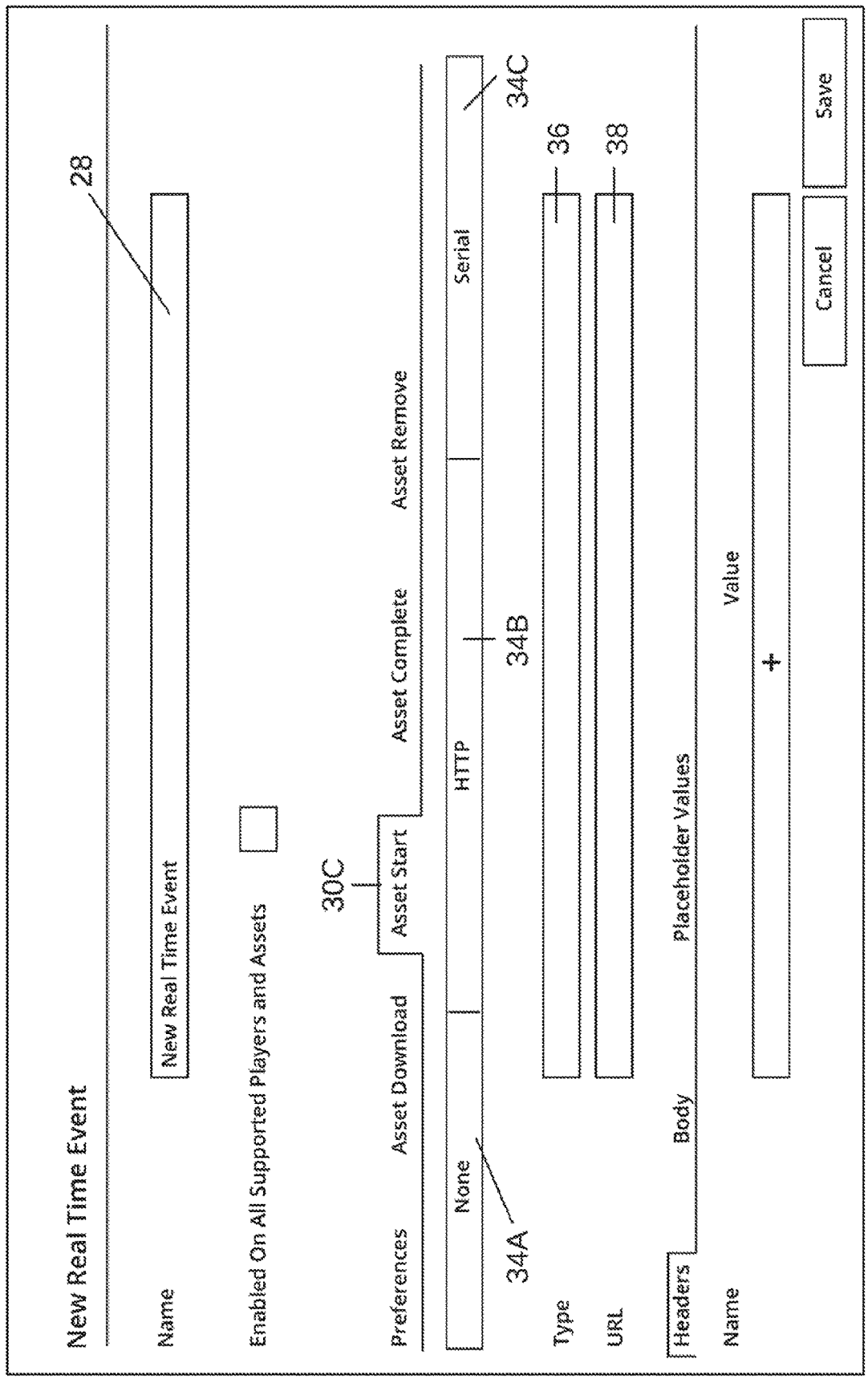
Figure 6J:
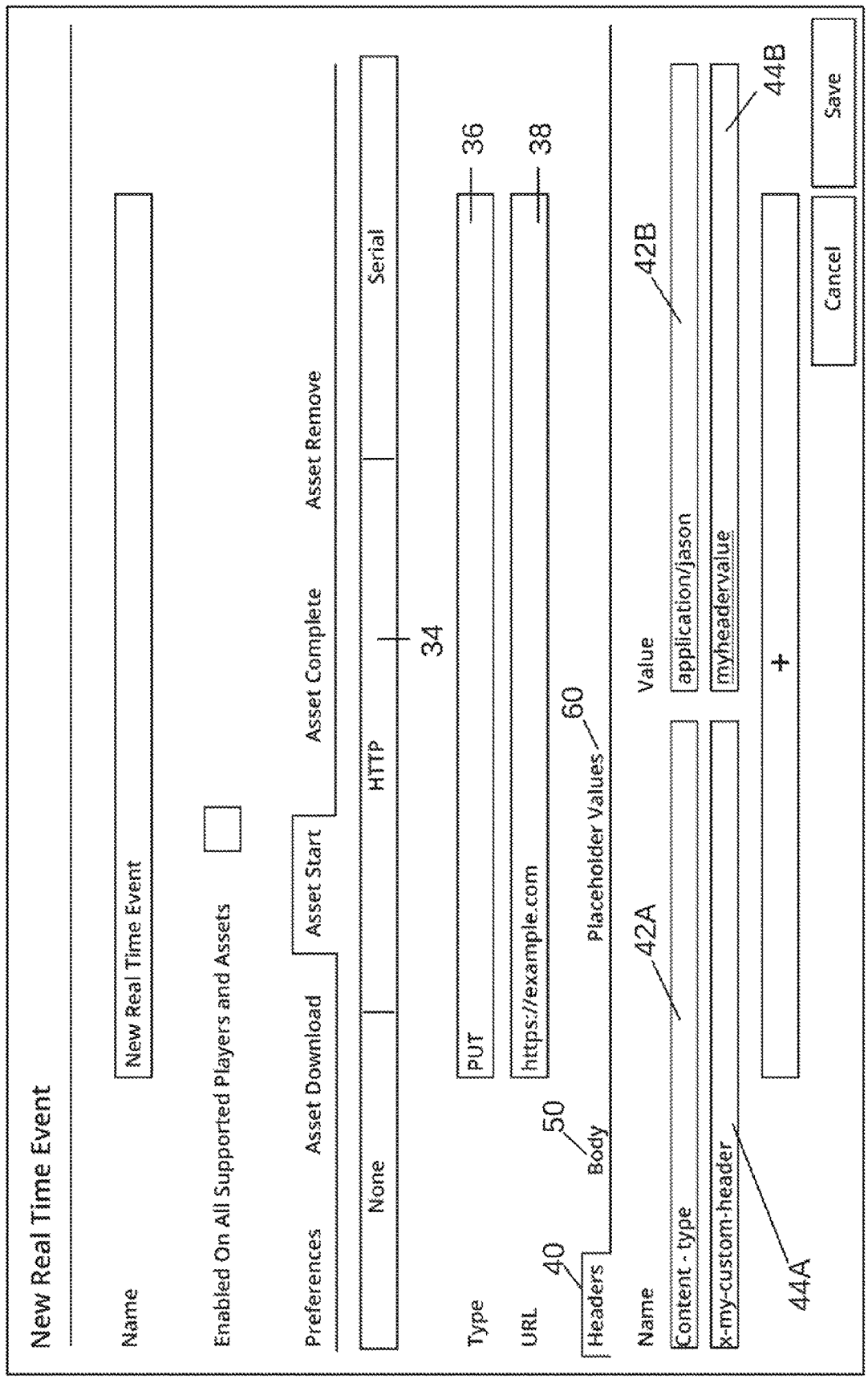
Figure 6K:
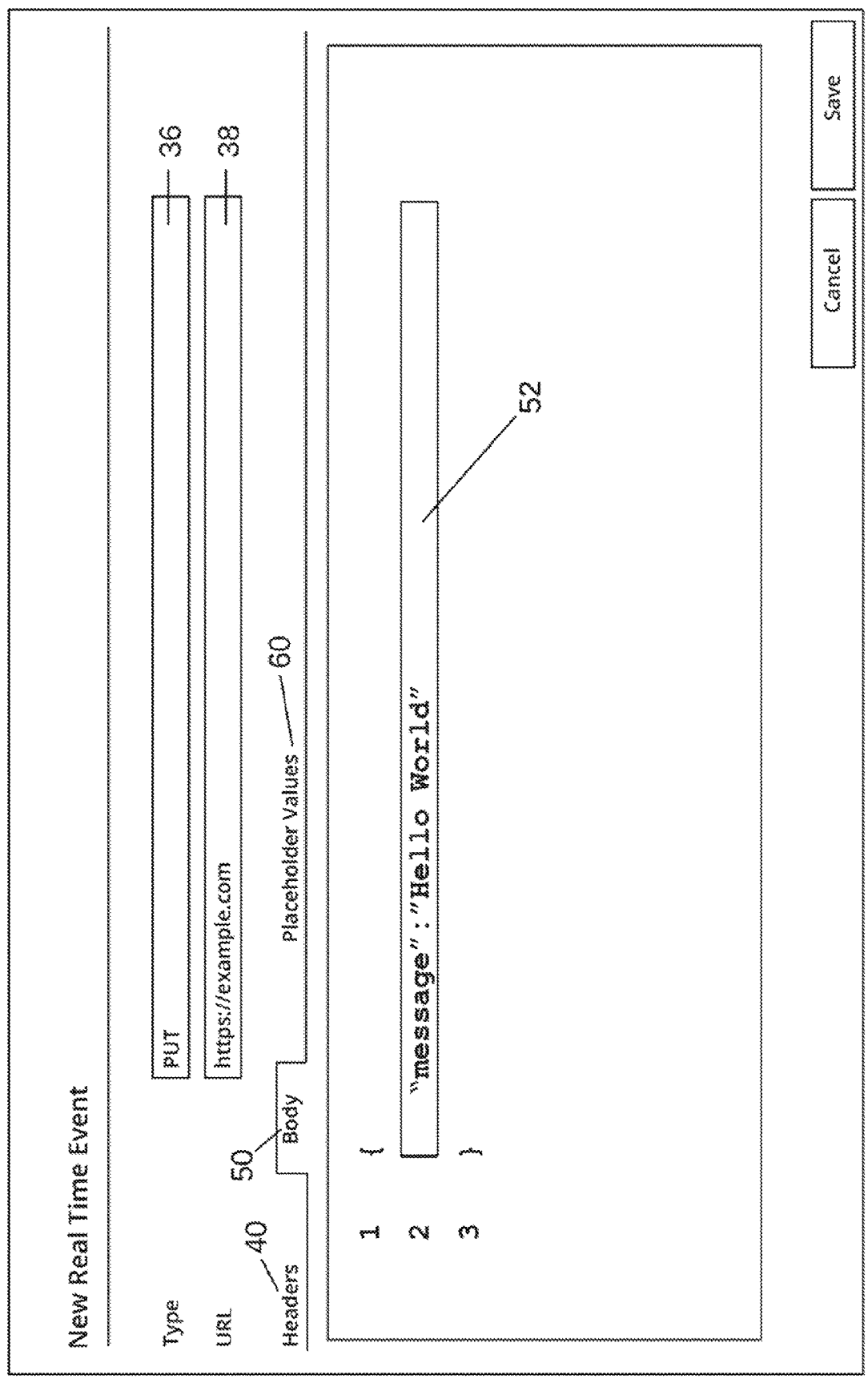
Figure 6L:
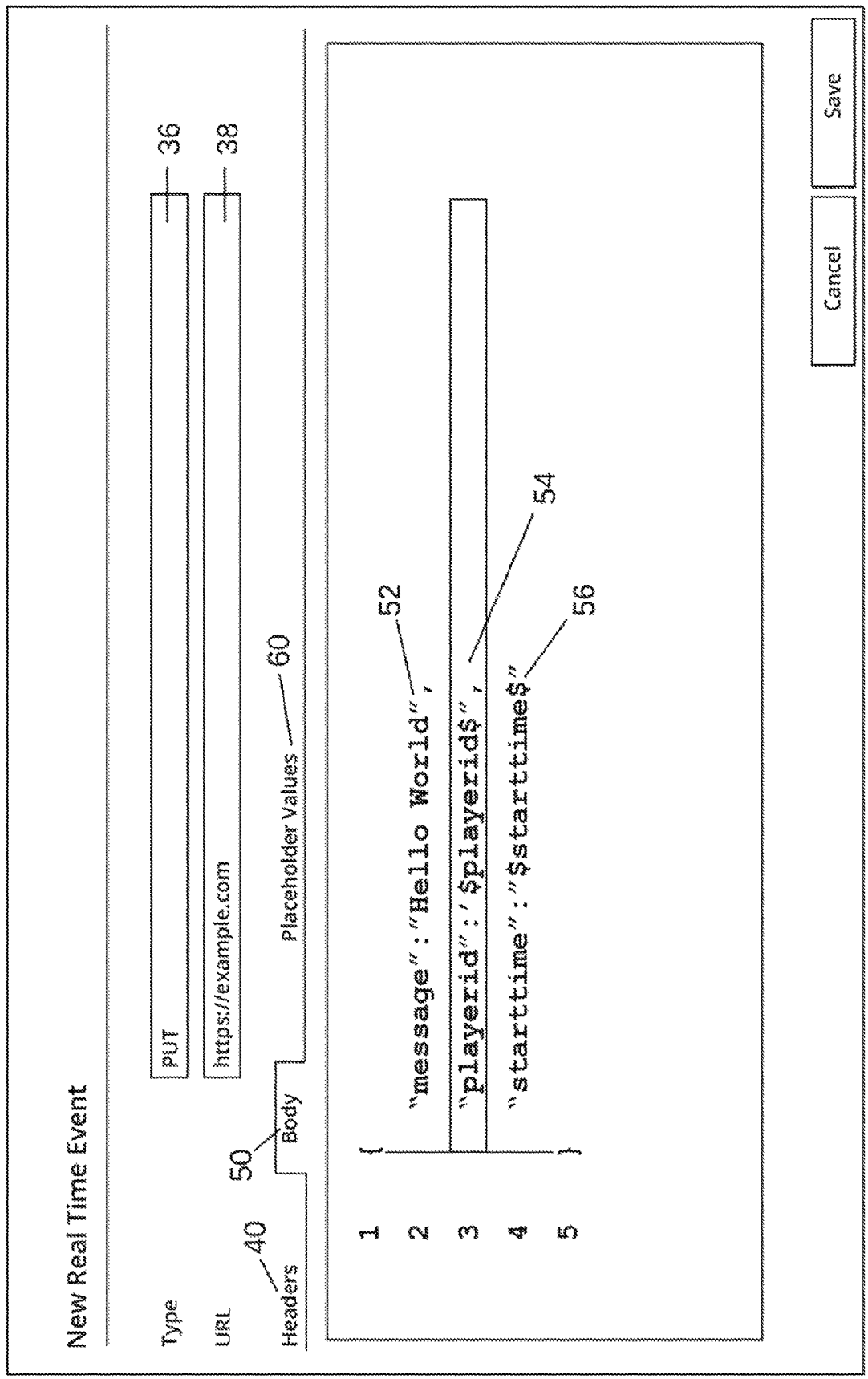
Figure 6M:
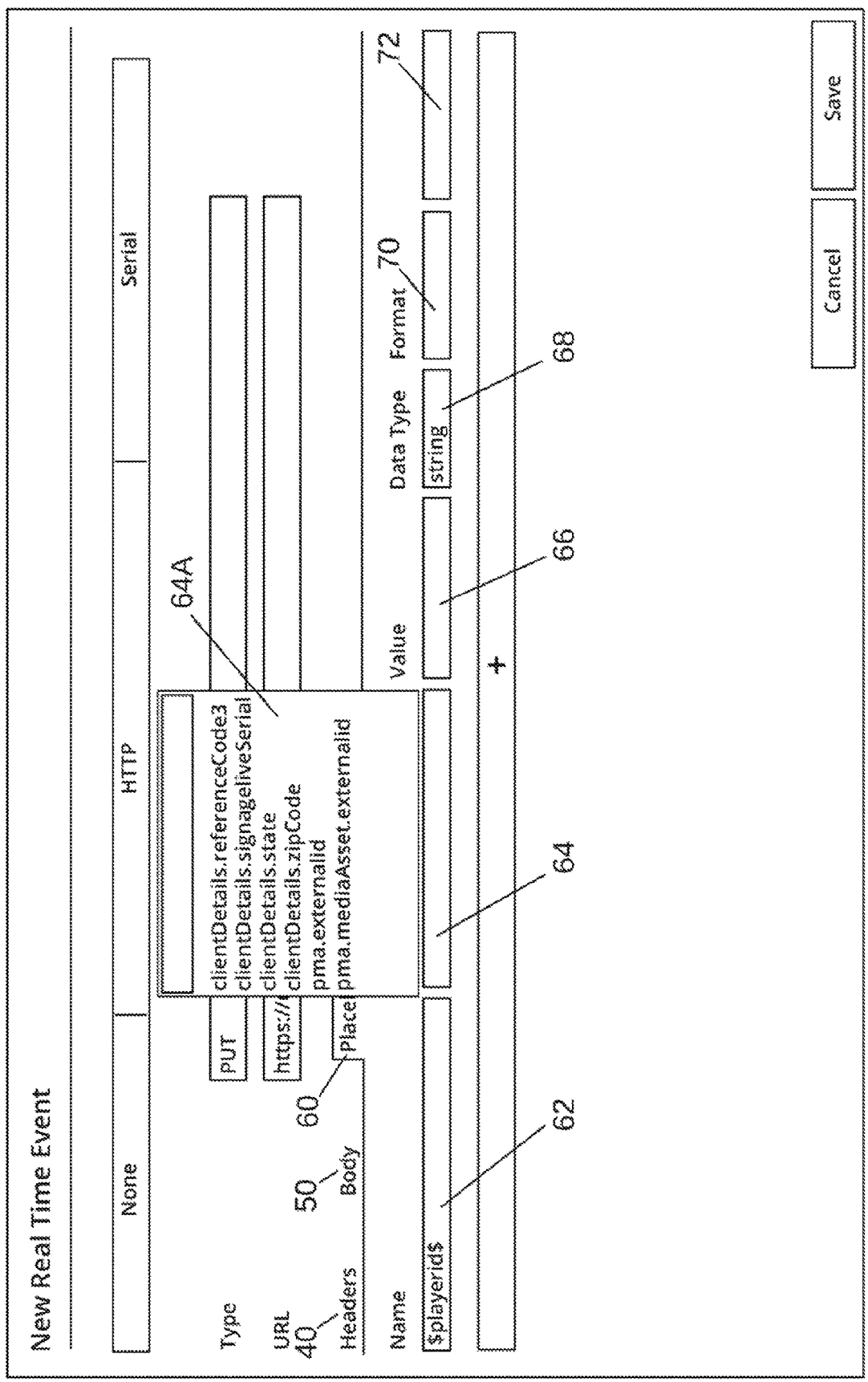
Figure 6N:
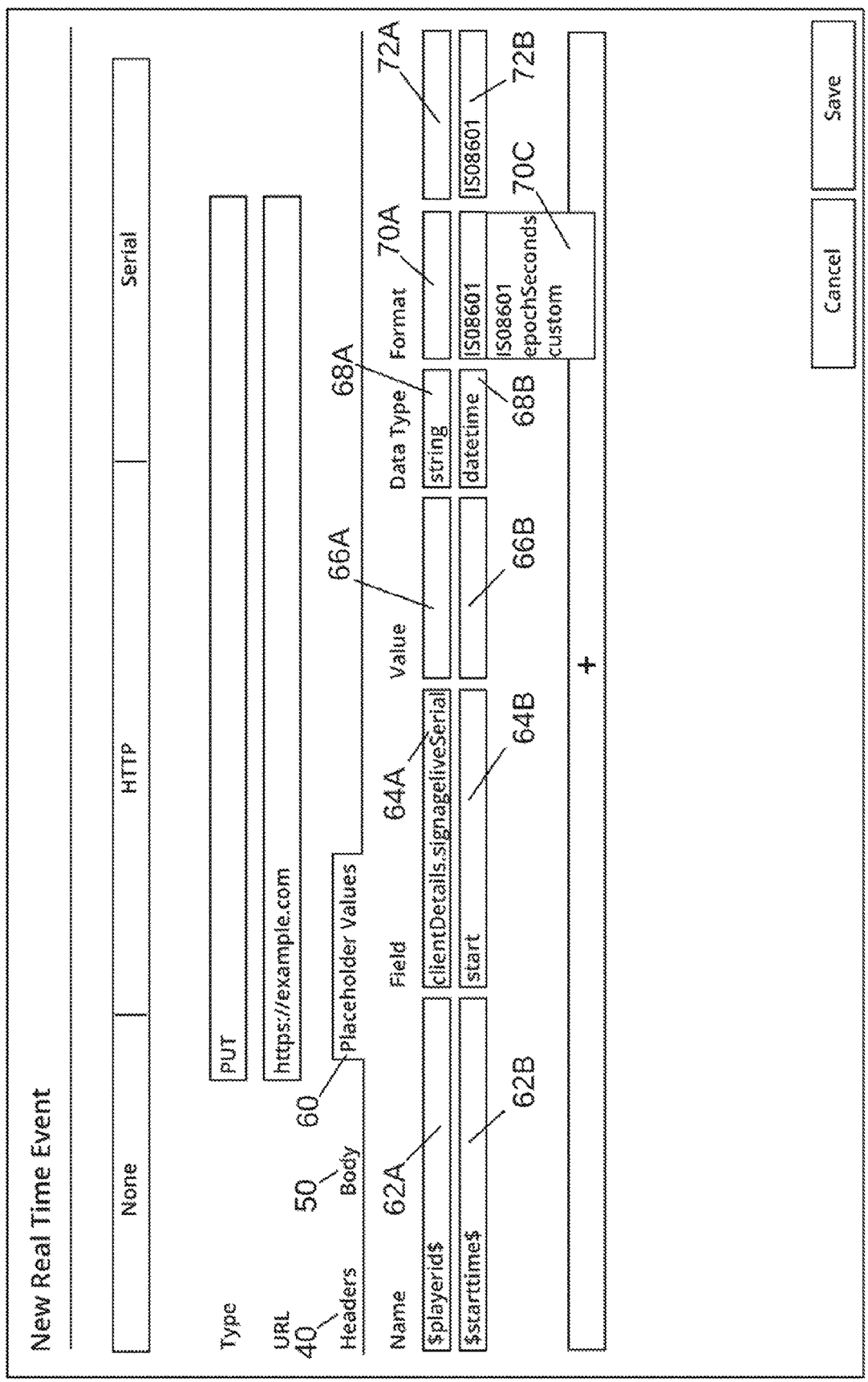
Figure 8:
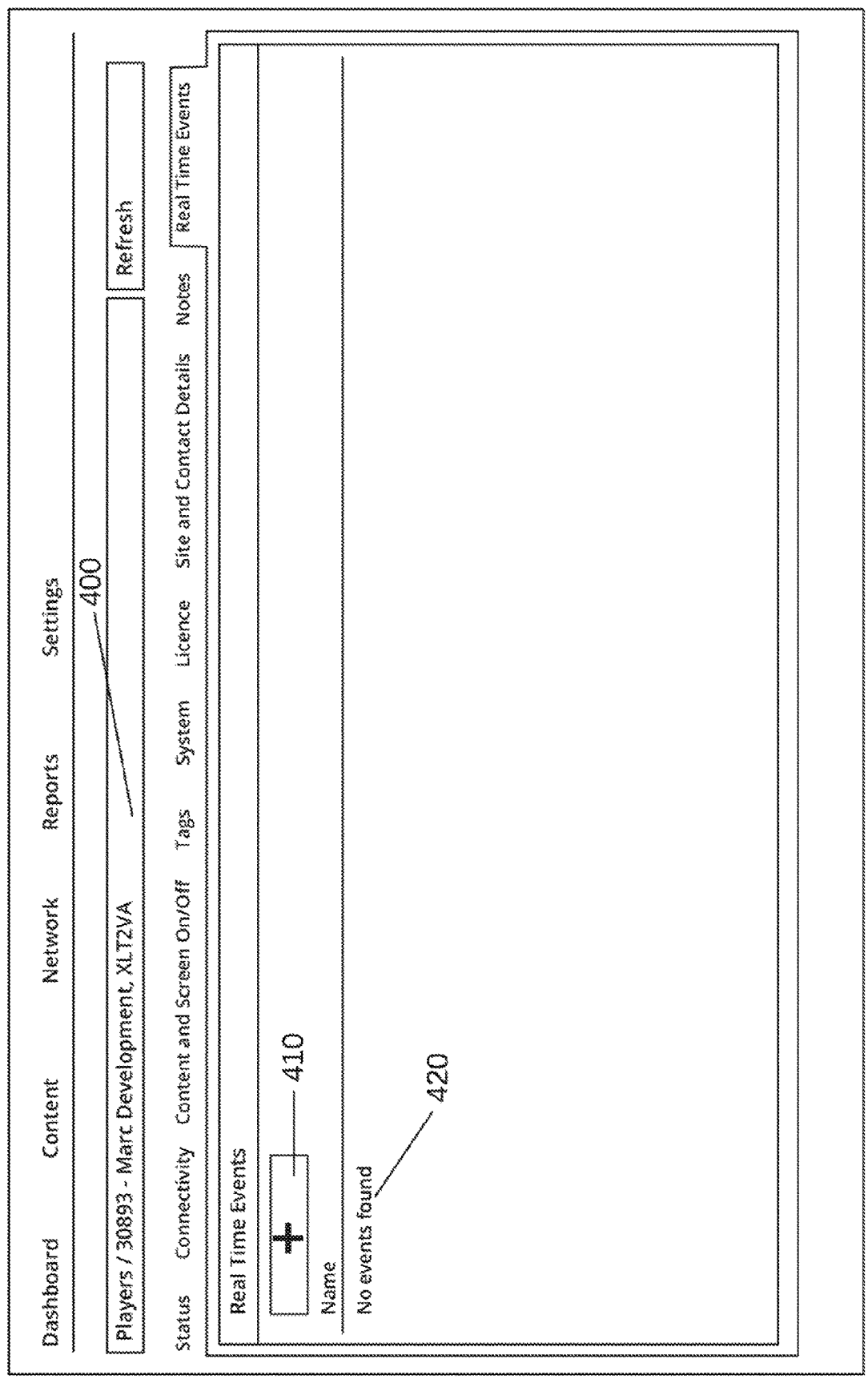
FIG. 8 is a view of a display of a user interface implementing another aspect of the present invention.
Figure 9:
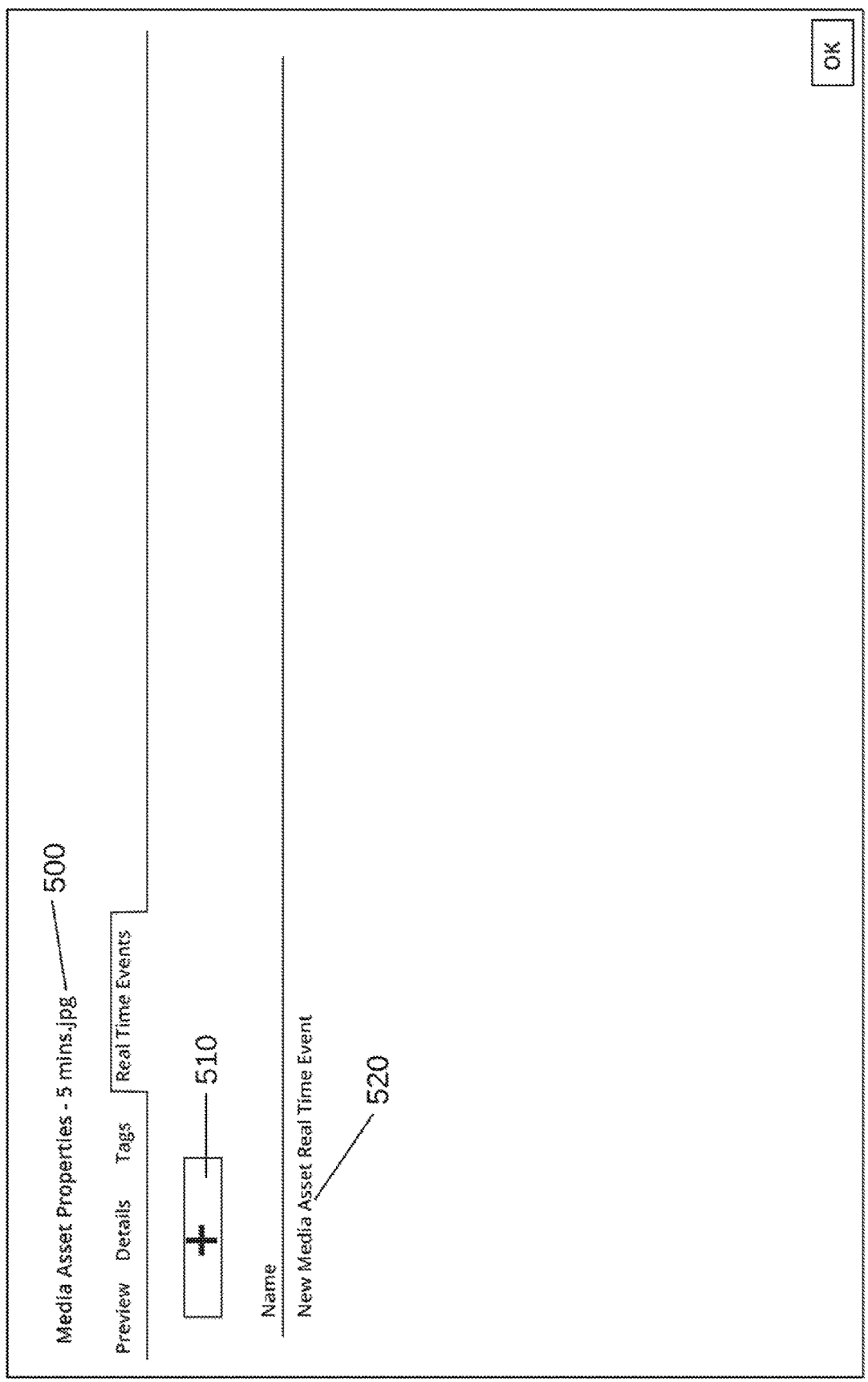
FIG. 9 is a view of a display of a user interface implementing another aspect of the present invention.

To illustrate this, FIGS. 6A to N show screenshots of the user interface 104 display in an exemplary process of creating an RTE command, which is to be executed when a particular media player starts to play a particular media asset. The RTE command is created using a template that has been stored on the computer device 100. FIG. 7 shows the creation of an alternative RTE command. FIGS. 8 and 9 show how an RTE command can be associated with a particular digital signage player 115 and a particular media asset respectively.

FIG. 6A shows an initial screen of the UI 104 when the user logs into the content management system 101 running on the computer device 100. As shown in the figure, the user can click box 5 to display all digital signage players 115 that he or she is licensed to use and that are active. Box 10 includes the list of all such active players, which in this example is a single player called '30983—Marc Development XLT2VA'. The user can click on or highlight a digital signage player 115 in box 10 and then click box 12 to display a drop-down menu 12A of settings for the chosen digital signage player 115, as shown in FIG. 6B.

If the user selects 'Real Time Events' from the drop-down menu 12A, the screen shown in FIG. 6C is displayed. This screen allows a user to add a new real time event by clicking on box 14, to search for existing, programmed real time events by using search box 16, and to view all real time events already created. The screen shows a system real time event being added to the network, so it is available to be added to one or more digital signage players 115. The screen also shows a list 18 of existing real time events. In this example, no existing real time events have been added. If the user clicks the '+' box 14, the drop-down menu 20 in FIG. 6D is shown. This allows a user to create a new real time event either from a template, as in the present invention, or to customize their own real time event.

If the user selects 'From Template' in drop-down menu 20, the screen shown in FIG. 6E is displayed. Here, the user is able to select from any predetermined template that is compatible with the chosen digital signage player 115 using the drop-down menu 22.

In this example, the user selects the template 'NEC ALP' as shown in box 24 in FIG. 6F. As shown in the figure, the user is able to give a name to the real time event he or she is creating by filling in the fields 26. Once this is done, the screen in FIG. 6G is displayed, allowing the user to configure the new real time event using the template. Specifically, FIG. 6G displays different tabs for the real time event. These include a preferences tab 30A, an asset download tab 30B, an asset start tab 30C, an asset complete tab 30D, and an asset remove tab 30E. Thus, the user is able to select different preferences for the new real time event and, by selecting one of tabs 30B to 30E, to choose the stage of the media asset lifetime at which the real time event should be triggered. The screen shown in FIG. 6G shows that the new real time event has been given the name 'New Real Time Event' in field 28 and that the user can click box 32 to set whether the new real time event should be enabled on all supported digital signage players 115 and media assets or only media assets on the chosen digital signage player 115.

In this example, the user decides that the new real time event command should be triggered at the asset start—in other words, when the digital signage player 115 plays the or each media asset, as shown in FIG. 6H. This means that the digital signage player 115 will send the external device a message when media starts to play. The user can then select the transport mode by which the digital signage player 115 should communicate with the external device 130 by clicking on one of tab 34A (None), tab 34B (HTTP) and tab 34C (Serial). It should be noted that depending on the configuration of the particular digital signage player 115 and external device, other transport modes may be available, such as Bluetooth, BLE, NFC etc. Having clicked on tab 34B, the user is presented with a 'type' field 36 for the type of HTTP request the digital signage player 115 should send and the URL of the external device 130 to which the digital signage player 115 should send the message. As shown in FIG. 6I, clicking on 'Type' field 36 brings up a drop-down menu 36A of the different types of HTTP request the user can select for the digital signage player 115 to send, in this case including standard request types GET, PUT and POST. As is known in the art, the GET method requests a representation of the specified resource. Requests using GET should only retrieve data. The POST method is used to submit an entity to the specified resource, often causing a change in state or side effects on the server. This is the request method selected in the exemplary part RTE command above, in which the digital signage player 115 is submitting data to the data warehouse 130. The PUT method replaces all current representations of the target resource with the request payload—that is, the value for the field. Other HTTP request method types can also be added to the template if appropriate. Once the request type and URL have been added, the template allows the user to enter details of the message by using tabs for the header 40, body 50 and placeholder 60, consistent with the exemplary message discussed above. This is shown in FIG. 6J. As the figure shows, in this example, the user has entered 'content-type' in field 42A with a value 'application/json' in field 42B (similar to what is discussed above) and an additional header called 'x-my-custom-header' in field 44A with the value 'myheadervalue' in field 44B. This demonstrates that the header may be fully customisable in this example, although the skilled addressee will understand that only predetermined header names and/or values may be templated. Thus, in the present embodiment, the user enters these details as free text, but it is possible instead or in addition to allow the user to select from a drop-down menu for either or both fields 42A, 44A or 42B, 44B.

FIGS. 6K and 6L show how the user can enter lines in the Body, each line including a field before the colon and a value after the colon, as discussed above. The labels will be understood by the API or other instance on the external device 130 to which the message is directed. Again, the user may be presented with a drop-down menu of suitable fields, or the user may add them as free text, or the user interface 104 may provide for a combination of both. As shown in FIG. 6K, the value after the colon may be fixed without using a placeholder (in this case "Hello World" in line 52). However, as discussed above and shown in FIG. 6L, the user may also use a placeholder for dynamic values stored on or otherwise created on the digital signage player 115, which the digital signage player 115 inserts in the payload of the message when it executes the RTE command. Examples are shown in lines 54 and 56 of FIG. 6L, in which the user has inserted the placeholder names '$playerid$' in line 54 and '$starttime$' in line 56. It is preferred that the user creates the placeholder as free text, but it is also possible for the template to provide a drop-down menu of possible or suggested placeholder names.

Each placeholder name entered by the user must be assigned a value. This is done by clicking on the Placeholder Values tab 60. In the name field 62, the user then either retypes each placeholder name they have used in the Body tab, or a drop-down menu may be displayed of suggested placeholder names and/or the placeholder names that have already been used in the Body. Of course, it would also be possible for the user to create placeholders in the Placeholder Values tab 60 first, and for the Body tab 50 to show a drop-down menu of all the placeholders already created using the Placeholder Values tab 50. When creating placeholders, the user then also can also enter information in the Field box 64, the Value field 66, the Data Type field 68, and the Format field 70.

FIG. 6M shows how a drop-down menu 64A is provided for the Field box 64. In this example, it shows all the fields in the memory 220 of the digital signage player 115 storing data, which the digital signage player 115 can substitute for the placeholder in the body of the message. The available fields for the digital signage player 115 will be known and can be easily provided as different options in the template. As evident from the example above, where the Field field 64 is completed, it is not necessary to complete the Value field 66 too. Conversely, when the Value field 66 is completed, it is not necessary to complete the Field field 64 too. Moreover, instead of completing the Value field 66, it is possible for the user to type this directly in the body using the Body tab 50. Drop-down menus may also be provided in the Data Type field 68 and the Format field 70. When the format is selected, this is used to populate box 72 automatically. FIG. 6N shows how two placeholders A and B are defined, and how a drop-down menu 70B is shown for the Format field 70.

Thus, the invention provides a template by which the user can create an RTE command to be sent to the digital signage player 115. The template includes predetermined options for the transport mode, which are known to be compatible with both the digital signage player 115 and the external device 130, for the user to select. In addition, the temple includes a way for the user to complete the message body in a way that the digital signage player 115 can update and send to the external device 130 with no knowledge of the configuration of that external device.

That is, the digital signage player 115 is agnostic about the configuration of the external device, and the RTE command only exposes to the digital signage player 115 key parameters such as the destination details, for example routing information, and optionally authentication details, which are unique to the instance of the external device 130. There is no need to integrate the software of the digital signage player 115 with that of any additional external device, since the method and system of the present invention allows all digital signage players 115 configured to support a transport mode to communicate with any external device compatible with that transport mode, irrespective of its configuration. Thus, without any additional updates of the digital signage player 115, it can be made to operate with multiple different external devices, all using different APIs and/or having other varied aspects of configuration.

Since an aspect of the invention also includes a template for creation of an RTE command, it is straightforward for an end user to create an RTE command based on the template, again without needing to reconfigure the digital signage player 115. The template provides tabs and fields to guide the user as to how to create the RTE command, and also provides predetermined options for various fields, which the user can select using drop-down menus, again assisting users who may not have a detailed grasp of the configuration of the digital signage player 115 to create the RTE message.

Templates can be created at different levels of generality. For example, a template can be created for an external device with a known API, limiting which fields are shown in the drop-down box 64A to only those that are compatible with the API of the external device 130 that is being addressed by the message. Alternatively, a very general template exposing all possible fields available in the digital signage player 115 in the Value field 64 could be created, or a template compatible with only a plurality of external devices may be created. Again, templates can be generalised to different types and configurations of digital signage player 115 or made specific to one or a limited number of digital signage player 115 configurations.

The CMS 101 controller or provider may make all templates available to all users, or it may restrict the templates available to a user, for example on a license basis. A user may have an account with the CMS 101 provider, and the CMS 101 may be configured such that, when the user opens a template, the CMS 101 injects appropriate user data into the template, for example populating a drop-down menu with destination/routing details of external devices known to be in the user's network.

In the example above, the template is accessed through the UI 104. However, templates may otherwise be made available, such as in the digital asset management system 112 and the supply side platform 113 so that RTE commands can be pushed to and pulled by the CMS 101, for example using an RSS feed created from a third-party user interface.

FIG. 7 shows an example of the configuration of an RTE command using the serial transport mode, for example where the AV control equipment 120 is the external device to which the digital signage player 115 is required to send a message. In this case the Serial tab 34C has been selected in FIG. 6H and the user can complete various different predetermined fields.

In this example, there are fields Baud Rate 90A, Parity 90B, Flow Control 90C, EOL 90D, Port 90E, Data Bits 90F, Stop Bits 90G, Protocol 90H and Delay 90I. Of these, fields 90E and 90I are free text fields and the others use drop-down menus allowing the user to select one from among a plurality of predetermined options to populate them. These fields and the options in the drop-down menus are generally known in the art and are exposed to the digital signage player 115 to enable it to send the message to the external device 110 correctly.

The user interface screen in FIG. 7 also shows a Commands window 95 in which the user can insert commands that will be acted on by the external device — in this case, the AV control equipment 120. The manufacturer of the external device will typically make available to the user or the controller of the computer device 100 the commands and format of commands that can be used to control that external device. Thus, the user will be aware of the configuration of the external device and will type in or otherwise insert in Commands window 95 commands that will be understood and executed by the external device. In this example, the RTE command again includes destination information and a payload. Here, the destination information includes the information in fields 90A-1 and the payload includes the commands in the Commands window 95.

Thus, in the context of a serial transport mode, the destination information in the present invention corresponds to the connection settings, and the payload or body section corresponds to the commands.

Accordingly, as in the example in FIG. 6, this requires the user or controller to have knowledge of the configuration of the external device to input the destination information (connection settings) and the payload (commands). However, the digital signage player 115 is agnostic to, and need not be integrated with, the configuration of the external device. In the present embodiment, the Commands window 95 is free text, but one or more drop-down windows consistent with the known configuration of the external device may be provided.

In the same manner as the example in FIG. 6, the information in the fields 90 is exposed to the digital signage player 115, which uses this information to direct the message to the correct destination. However, the information in the Commands window 95 is not exposed and is contained without change in the message.

In this example, placeholders are not used. However, the skilled addressee will appreciate that it is also possible to use the placeholders aspect of the present invention in a template for an RTE command where the digital signage player 115 will send a message to the external device 120 using the Serial transport mode.

FIG. 8 shows a user interface 104 screen by which an RTE command can be associated with a particular digital signage player 115. In FIG. 8, a list 400 of digital signage players 115 available on the customers network is displayed. In the example, only one digital signage player 115, called '30893—Marc Development, XLT2VA' has been selected. In addition, a list 420 of RTE commands associated with all the selected digital signage player(s) 115 in the list 400 is displayed. The user can add previously created RTE commands to the list 420 by clicking on the '+' button 410, which calls up a list of previously created RTE commands compatible with the digital signage player 115, or all the digital signage players 115, in the list 400.

In a similar way, FIG. 9 shows a user interface 104 screen by which an RTE command can be associated with a particular media asset. In FIG. 9, a list 500 of media assets contained on the customer's network is displayed. In the example, only one media asset, called 'Media Asset Properties—5 mins.jpg' has been selected. In addition, a list 520 of RTE commands associated with all the selected media asset(s) in the list 500 is displayed. The user can add previously created RTE commands to the list 520 by clicking on the '+' button 510, which calls up a list of previously created RTE commands that can be associated with the media assets in the list 500.

It will be appreciated that the present invention provides a generic method and apparatus for integrating external devices into an existing digital signage system 1 comprising a computer device 100 and a display device 300 with a digital signage player 115. The external devices can be messaged or controlled from the digital signage player 115 throughout the media asset lifetime, and once a digital signage player 115 has been updated to operate with a predetermined transport mode, there is no further need to create an additional solution to integrate any new external device that uses that transport medium. In other words, a digital signage player 115 needs only be updated once to be able to send a message using the transport medium specified in the RTE command, in order to be able to successfully communicate with any external device that uses that transport medium. This saves the work of developing a specific new integration of the digital signage player 115 with each new external device with which it needs to communicate. Since each external device may have its own API or command structure, which must be adhered and uses a particular data structure, this work is laborious, expensive and time-consuming.

By contrast, with the present invention, the user is able to build RTE commands at the computer device 100 or their own PC 11 using templates, as well as building their own RTE commands manually, the RTE commands causing the digital signage player 115 to message or otherwise control the external device.

As the solution is dynamic, there is no need to update the digital signage player 115 with the specifics of the integration. Instead, it is only necessary to transmit the RTE command including destination details (routing information) and, where appropriate, placeholders exposed to the digital signage player 115 to act on. The digital signage player 115 does not need to be programmed to understand the payload of the message—that is, the body of an HTTP message (save for inserting placeholder information) or the commands in a serial message. Similar considerations will apply for other transport types.

The foregoing explains how RTE commands can be configured using the user interface 104. However, they can also be configured by the API 102, in which case they are pushed from another system, for example the digital asset management system 112, or by the external source synchronisation service 103, in which case they are pulled from another system, for example the supply side platform 113.

In addition, the present invention allows the user to set the configuration of the RTE command to operate at different layers in a predetermined hierarchy and inherit the configuration from the layers above. A preferred hierarchy is
1. Network 1
2. Digital signage player 115
3. Media asset This makes it possible to set the RTE command to execute on:
1. All digital signage players 115 and media assets in a network 1
2. All media assets published to a digital signage player 115
3. Only one particular media asset 4. Any combination of 1, 2 or 3—for example, one media asset on several players The present invention therefore allows to send multiple messages to disparate systems using different transport methods at any event in the media asset lifetime, so that multiple external systems can be affected or controlled.

The digital signage players 115 have no knowledge of the nature of integration—that is, that they are communicating with a particular system—only that they must perform a particular action. That action is to send a message, in the examples above using HTTP or Serial. The digital signage player 115 is exposed only to the destination details of the message and, where they occur, the placeholder values, and is otherwise agnostic to the configuration of the external device.

The present invention allows templated integrations configured separately from the digital signage player 115 with full control of the message, including the message structure, that is sent from the digital signage player 115 to the external device. Nonetheless, by the use of placeholders, it is still possible to include dynamic data within the message at the time of execution, including but not limited to a media asset ID, a time stamp, digital signage player 115 details (including address and general-purpose reference fields). It is also possible to control the format of the key placeholders within that message, for example the date and time formats and the ID formats.

Templates can be configured for known or commonly used external devices and systems. The templates abstract the complex message configuration and only expose key parameters such as destination or routing information or authentication details that are unique to each instance of an external device or system.

The present invention is extensible to new and different transport methods. Although support for HTTP and serial are explained above, support for another transport method can be provided by adding support for configuration within the CMS 101 and updating digital signage players 115 to support the transport. As the RTE commands and messages being sent are configured in a generic way then any external system that utilises this new transport mechanism, even those the CMS 101 provider is not aware of, are instantly supported without further effort from the CMS 101 provider.

Where the RTE command uses HTTP as the transport mode, the digital signage player 115 may cache the request if the external device 110, 120, 125, 130, 112, 113 is unreachable or does not successfully accept the request, for example, if HTTP is used as the transport mode. Failures may be identified by either an error being thrown or by a specific response code, for example in the 400-499 or 500-599 ranges, which is a standard HTTP feature. For example, when the request fails, the request is persisted to the non-volatile memory of the digital signage player 115 along with the time at which it failed for the first time. When connectivity is restored, the request is replayed i.e. tried again. If it is successful, subsequent failed requests may be replayed in the same manner. The request may be cached indefinitely or discarded after a certain amount of time has passed.

One effect of the invention is that it is possible to use the CMS 101 to quickly and easily integrate with both known and unknown external systems in a way that is agnostic to the digital signage player 115. This is achieved by exposing the end user/integrator/third party to configuration options, including the entire message structure at the CMS 101 level.

There are a number of use cases that this solution can be used within. Note that the CMS 101 sends an RTE command, which causes the digital signage player 115 to send a message to the external system, and the external system interprets the message and acts on it. The specific action is the domain or focus of that system, and the digital signage player 115 is agnostic to it.

One example in which the present invention can be used is control of lighting effects. It is possible to dynamically change the lighting around a screen, in a venue or even under specific products. For example, if the media asset is a soft drink, a media start RTE command can cause the digital signage player 115 to send to the lighting controller 110 a message to switch on red ambient lighting at the start of playing that media asset. Subsequently, a media end RTE command can cause the digital signage player 115 to send to the lighting controller 110 a message to switch back to a standard lighting arrangement at the end of playing that media asset.

Another example is control of audio. It is possible to control instore audio solutions by the digital signage player 115 sending an AV controller 120 a message causing switching of the source audio from Instore Radio to audio from the digital signage player and back dependent on the video content that is playing. Again, this can be achieved by using media start and media end RTE commands.

A further example is control of visual presentation equipment. It is possible to control AV equipment 120 such that the AV feed switches between AV from the digital signage player 115 to AV from another source, such as a camera or STB feed. This can be achieved, for example, by the message from the digital signage player 115 to the AV equipment 120 causing the AV equipment to change the source to another input on an HDMI switch. The change can be, for example, for a set time before changing the AV source back to the digital signage player 115. On supported display devices 300, these changes can be made internally too. Supported external devices may perform this operation without the need for external equipment.

It should therefore be understood that the I/O 330 including display 335 of the display device 300 on which the digital signage player 115 is loaded can act as the external device.

It should also be understood that the digital signage player 115 need not be loaded on a display device 300, as described above. Instead, the digital signage player 115 can be implemented in a personal computer or other device, which is connected to the display device 300. Thus, the present invention allows the digital signage player 115 to be operated with any new display device 300 that it may be connected to, without the need to integrate the digital signage player 115 and the display device 300.

The present invention can also be used to provide mechanical effects. It is possible to trigger robotics and other mechanical physical sequences as content plays out on the display screen 335, for example by lifting and rotating screens, or platforms on which an advertised product is placed, or rotating turntables etc.

As discussed above, the present invention can also be used to provide real time proof of play for many different external devices, such as data warehouse 130, or digital asset management system 112 or supply side platform 133. As a generic command can be sent to any end point it is possible to log into any solution when a content item has played. This can then be used for Al if the playlist is dynamically controlled by an intelligent platform, logging impressions of an advertisement with a supply side platform for ad sales, sending to facial detection solutions to analyse who is viewing which content in real time, and so on.

As the present invention exposes a range of interfaces to configure real time event commands, it is possible for the CMS 101 provider to become the media hub, and potentially experiential hub, within an environment. For example, the environment can react to the media that is playing on the screen. In particular, lighting, audio or mechanical systems can react to the media playing. The dynamic nature of the configuration does not limit the use cases of the solution especially when coupled with the ability to inject contextual dynamic data.

In summary, in the present invention, the computer device 100 (CMS 101) sends an RTE command to the digital signage player 115. The RTE command instructs the digital signage player 115 to send a message to a particular external device. The RTE command includes destination information, such as the URL and header information in the case of an HTTP transport mode and connection settings in the case of the serial transport mode. The destination information may also include authentication information, such as a password, for example so that an HTTP request is accepted by an external device. The RTE command also includes a payload, which is the message or instructions that will be sent to the external device.

In this way, the digital signage player 115 can be controlled to send a message to the external device corresponding to the destination information with a message payload corresponding to the command payload and compatible with the external device. Here, the message payload comprises, for example, information or commands that are sent to the external device.

Put another way, the RTE command sends to the digital signage player 115 the configuration of (destination details for) the external device together with the message or commands (payload) that need to be sent to it. The digital signage player 115 simply uses the configuration details included in the RTE command to send the payload to the correct device. So long as the digital signage player 115 is capable of using the same transport mode as the external device, there is no need to change the configuration of the digital signage player 115 to match that of the external device to allow the two to communicate.

It is not necessary for the digital signage player 115 to change the payload — it can simply forward it to the external device without change. However, as discussed above, in some embodiments, the digital signage player 115 may substitute information that it stores or creates in place of placeholders in the payload (or in the destination information).

Thus, the message payload preferably corresponds to the RTE command payload exactly or by including corresponding lines of information or commands. Particularly preferably, each line or item of information, or each command, in the message payload has a corresponding line or item of information, or a corresponding command, in the RTE command payload.

The invention may also be expressed as the digital signage player 115 having a first configuration (software, hardware, firmware) and the external device having a second configuration different from the first configuration. Because the two configurations are different, the digital signage player 115 may not be programmed or otherwise know how to communicate with the external device. The RTE command is compatible with the first configuration and causes the digital signage player 115 to send a message compatible with the second configuration to the external device. The RTE command includes destination information (routing information, connection information, authentication information) for the external device and a command payload (information or instructions for the external device). In this way, the digital signage player 115 can be controlled to send a message to the external device corresponding to the destination information with a message payload corresponding to the command payload and compatible with the second configuration.

The structure of the destination information and the body section are compatible with the configuration of the external device. The destination information and/or the body section include(s) a placeholder indicating that the digital signage player 115 should retrieve from its memory data associated with the placeholder and swap it for the placeholder. In this way, it is possible to create a message to send to the external device in the right format by simply substituting the associated data for the placeholder in the destination information/body section. The message that the digital signage player 115 sends to the external device can thus be or include the destination information and the body section with the substituted associated data.

In other words, the command sent by the computer device 100 includes destination information and a body section in a structure consistent with the communication protocol, message format and command language of the external device, which may be different to those of the digital signage player 115.

The foregoing description has been given by way of example only and it will be appreciated by a person skilled in the art that modifications can be made without departing from the scope of the present invention as defined by the claims.

In particular, whilst the present invention has been described with reference to a digital signage environment including a CMS 101 and a digital signage player 115, the present invention has broader application and could be used in any system where a first computing device is connected to a second device, which in turn is connected to an external device, and the second device and external device need to be integrated.

It should also be understood that it is not necessary for the command sent from the computer device 101 to be an RTE command—that is, the command need not be associated with an event in the timeline of a media (or other) asset.

From the foregoing, the skilled addressee will understand that the present invention provides a mechanism to interact with external systems not on demand but at specific times, such as when media assets transition through different states, for example:

1. Download
2. Start Playing
3. Stop/Finish Playing
4. Remove 2 and 3 can occur multiple times as can associated real time events.

The inventions enables the end user to have full control of the message that is to be sent at each point in the timeline, they are able to:

1. Set the communication protocol (UDP, TCP, HTTP)
2. Configure the communication method (Url, Ports etc)
3. Set the message data to be sent
4. Dynamically inject state data into the message e.g. Date Times operations occur, Media Asset Ids.

The present invention is capable of sending commands (such as real time event commands) to digital signage players, and hence of inducing it to send messages to external systems such as a projector or other hardware, such as Video input switching and control equipment (e.g. change source input of a video wall controller)

Audio control systems (e.g. volume up, down, mute, source of an audio distribution system)

Lighting control systems (e.g. system to switch on/off, change colors, brightness of lighting effect)

Mechanical control systems (e.g. screen lifts)

Software Systems either locally or remote (e.g. Proof of Play collectors, Al systems to dynamically control content)

Thus, whilst the digital signage player 115 is focused on playback of media assets, the invention allows the control, monitoring and management of the external devices by means of the digital signage player by sending data to external devices based on an "integration by configuration" principle. That is, the correct configuration of the command sent from the CMS 101 allows the digital signage player 115 effectively to integrate with external devices.

By integrating with local hardware devices such as video, audio, lighting, mechanical devices as described, the digital signage player can orchestrate experiences in venues based upon the media playing—the digital signage player is the hub of the experience controlling external devices.

By integrating with software systems the digital signage media player can transmit real time data directly to those systems sharing real time data related to the execution of media assets. Here the integration by configuration principle allows the message to be sent by the digital signage player to the external device to be described and data to be injected as they are executed.

Characteristics that may be afforded by the present invention, but which are not individually essential include:

No on demand user initiated commands are needed

No internal library of devices or device controls is required

No scheduling of commands is necessary

Communication from the digital signage player to the external device/system can be one way i.e. the response need not be processed or transmitted back to computer device 100

Communication can be in-band (that is, RTE commands are tied to and can be sent with media assets) not out-of-band. Here, in-band communication is when control and data are sent along the same connection. Connectivity between the CMS 101 and digital signage player 115 is over HTTP which is in-band. Out-of-band is when the control and data are sent along different connections.

Messages to the external device can be sent in reaction to media asset events, and need not be on demand or scheduled The present invention does not require a unified API to simplify usage and integration of disparate devices/systems The present invention can send the configuration details of the message to be sent to the external device in a proprietary data structure understood by digital signage players (media players), and each media player is able to parse the configuration and construct the interfaces locally to perform the operation against the external device/system The present invention enables users to define the communication protocol and message to send The present invention gives the ability to inject data into the message to provide meaningful data points for 3rd party systems such as those collecting proof of play

The invention claimed is:

1. A system comprising a computer device,
a digital signage player connected to the computer device and configured to play a digital media asset on a display device, and
an external device that is external to the display device and connected to the digital signage player, wherein
the computer device is configured to send a command to the digital signage player, said command being associated with the digital media asset and causing the digital signage player to send a message to the external device; and
the command includes destination information for the external device and a body section,
whereby the digital signage player is further configured to be controlled to send the message to the external device corresponding to the destination information with a message payload corresponding to the body section and compatible with the external device.

2. A system according to claim 1, wherein the command is configured to control the digital signage player to send the message at a time of an event associated with the media asset.

3. A system according to claim 1, wherein the computer device is a content management system for controlling a plurality of digital signage players to play media assets.

4. A system according to claim 1, wherein
the command includes a placeholder section;
at least one of the destination information and the body section includes a placeholder; the placeholder section defines for the placeholder how data is stored in the digital signage player; and
the digital signage player is configured to create the message by substituting associated data for the placeholder, whereby the message is compatible with the external device.

5. A system according to claim 4, wherein a structure of the destination information and the body section is compatible with a configuration of the external device such that when the associated data has been substituted for the placeholder, the destination information and the body section can be sent as the message compatible with the external device.

6. A system according to claim 4, wherein
at least one of the destination information and the body section includes at least one of a field for a piece of information and an instruction, the field being compatible with the external device, and said placeholder is associated with the field, and
the placeholder section defines for the placeholder how data associated with the field or the instruction is stored in the digital signage player.

7. A system according to claim 4, wherein the destination information includes a URL and a header, and at least one of the URL and the header includes said placeholder.

8. A system according to claim 4, wherein the placeholder section defines for each placeholder the format for the external device.

9. A system according to claim 4, wherein the placeholder section defines for each placeholder at least one of a storage field in the digital signage player, a value, and a data type.

10. A system according to claim 1, wherein the message payload comprises a line or item of information corresponding to a line or item of information in the body section.

11. A system according to claim 1, wherein the digital signage player is configured to send the body section as the message payload.

12. A computer device configured to be connected to a digital signage player that is configured to play a digital media asset on a display device and is connected to an external device that is external to the display device, wherein the computer device comprises:
- one or more processors;
- a graphical user interface; and
- a storage device, wherein the computer device is configured to send a command to the digital signage player, said command being associated with the media asset to be played on the display device and causing the digital signage player to send a message to the external device; and
- The command includes destination information for the external device and a body section, whereby the digital signage player is configured to be controlled to send a message to the external device corresponding to the destination information with a message payload corresponding to the body section and compatible with the external device.

13. A computer device according to claim 12, wherein the storage device stores at least one user editable template for creating said command, wherein the at least one user editable template specifies a configuration for execution on one or more external devices.

14. A computer device according to claim 13, wherein the at least one user editable template allows a user to:
- add a plurality of fields to the message, each field for at least one of a piece of information and an instruction, each field being compatible with a configuration of an external device,
- associate a placeholder with each field, and
- select for each placeholder an identification of at least one predetermined item of data in the digital signage player which is compatible with each field.

15. A computer device according to claim 14, wherein the at least one user editable template allows a user to select for each placeholder at least one of a value, a data type and a format of at least one of the pieces of information and the instruction which is compatible with the configuration of the external device.

16. A digital signage player configured to play a digital media asset on a display device, wherein the digital signage player is further configured to be connected to a computer device and to an external device that is external to the display device,
- wherein the digital signage player is configured to receive a command from the computer device, the command being associated with the media asset to be played on the display device and causing the digital signage player to send a message to the external device, the command including destination information for the external device and a body section; and
- send the message to the external device corresponding to the destination information, a message including the message payload corresponding to the body section and compatible with the configuration of the external device.

17. A digital signage player according to claim 16, configured to send the body section as the message payload.

18. A digital signage player according to claim 17, wherein
- the command includes a placeholder section;
- at least one of the destination information and the body section includes a placeholder;
- the placeholder section defines for the placeholder how data is stored in the digital signage player; and
- the digital signage player is configured to create the message by substituting the data for each placeholder, whereby the message is compatible with the configuration of the external device.

19. A method of controlling an external device in a system comprising:
- a computer device,
- a digital signage player connected to the computer device and configured to play a digital media asset on a display device, and
- the external device, which is external to the display device and connected to the digital signage player,
- the method comprising:
- sending a command from the computer device to the digital signage player, the command being associated with the digital media asset, wherein:
- the command includes destination information for the external device and a body section; and
- the command causes the digital signage player to send a message to the external device corresponding to the destination information with a message payload corresponding to the body section and compatible with the external device.

20. A method of controlling an external device in a system comprising:
- a computer device;
- a digital signage player connected to the computer device and configured to play a digital media asset on a display device, and
- the external device, which is external to the display device and connected to the digital signage player,
- the method comprising:
- receiving a command from the computer device at the digital signage player, the command being associated with the digital media asset, wherein: the command includes destination information for the external device and a body section; and
- the command causes the digital signage player to send a message to the external device corresponding to the destination information with a message payload corresponding to the body section and compatible with the external device.

* * * * *